(12) United States Patent
Uchida et al.

(10) Patent No.: US 12,442,809 B2
(45) Date of Patent: Oct. 14, 2025

(54) HYGROSCOPICITY EVALUATION METHOD AND WATER CONTENT EVALUATION METHOD

(71) Applicant: HAMAMATSU PHOTONICS K.K., Hamamatsu (JP)

(72) Inventors: Tetsuya Uchida, Hamamatsu (JP); Kouichiro Akiyama, Hamamatsu (JP); Hiroshi Satozono, Hamamatsu (JP); Tomoyuki Hakamata, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 364 days.

(21) Appl. No.: 18/095,575

(22) Filed: Jan. 11, 2023

(65) Prior Publication Data
US 2023/0258620 A1   Aug. 17, 2023

(30) Foreign Application Priority Data

Feb. 14, 2022 (JP) .................................. 2022-020200
Aug. 24, 2022 (JP) .................................. 2022-133126

(51) Int. Cl.
G01N 33/24 (2006.01)
G01N 21/3581 (2014.01)
G01N 21/552 (2014.01)

(52) U.S. Cl.
CPC ....... *G01N 33/246* (2013.01); *G01N 21/3581* (2013.01); *G01N 21/552* (2013.01)

(58) Field of Classification Search
CPC ................... G01N 21/3581; G01N 21/3586
See application file for complete search history.

(56) References Cited

U.S. PATENT DOCUMENTS

| 2010/0243901 A1* | 9/2010 | Okamoto | C08J 3/203 |
| | | | 264/109 |
| 2018/0347354 A1* | 12/2018 | Li | G06N 20/00 |
| 2024/0418641 A1* | 12/2024 | Takahashi | G01N 21/552 |

OTHER PUBLICATIONS

Translation of Written Opinion of PCT/JP2022/040011 (Year: 2022).*

(Continued)

*Primary Examiner* — David P Porta
*Assistant Examiner* — Casey Bryant
(74) *Attorney, Agent, or Firm* — Faegre Drinker Biddle & Reath LLP

(57) ABSTRACT

A hygroscopicity evaluation method includes: a first step of preparing a first sample and a second sample; a second step of acquiring a first detection result for the first sample and a second detection result for the second sample by making a terahertz wave incident on each of the first and second samples; and a third step of evaluating the hygroscopicity of a measurement target object based on a first frequency characteristic calculated from the first detection result and a second frequency characteristic calculated from the second detection result. In the third step, the magnitude of the hygroscopicity of the measurement target object is evaluated based on the difference between the magnitude of a first peak of the first frequency characteristic in a reference frequency range and the magnitude of a second peak of the second frequency characteristic in the reference frequency range.

16 Claims, 25 Drawing Sheets

(56) References Cited

OTHER PUBLICATIONS

Osakai, Toshiyuki, "The Principle of Water-Content Determination by Karl Fischer Titration," Review of Polarography, vol. 63, No. 2, (2017), pp. 101-107.
Oueslati, Walid et al., "Quantitative XRD Analysis of the Structural Changes of Ba-Exchanged Montmorillonite: Effect of an in Situ Hydrous Perturbation," Minerals, 2015, 5, pp. 507-526.

\* cited by examiner

HYGROSCOPICITY EVALUATION METHOD AND WATER CONTENT EVALUATION METHOD

TECHNICAL FIELD

The present disclosure relates to a hygroscopicity evaluation method and a water content evaluation method.

BACKGROUND

As a known method for evaluating the water content of a measurement target object, for example, "The Principle of Water-Content Determination by Karl Fischer Titration" (Review of Polarography, Vol. 63, No. 2, (2017), p. 101-107 Toshiyuki Osakai) describes Karl Fischer titration. According to such Karl Fischer titration, the water content of the measurement target object can be evaluated with high accuracy.

SUMMARY

When using the Karl Fischer titration described above, the work may be complicated because the Karl Fischer titration involves a chemical reaction of the measurement target object. As a (nondestructive) method that does not involve a chemical reaction of the measurement target object, for example, "Quantitative XRD Analysis of the Structural Changes of Ba-Exchanged Montmorillonite: Effect of an in Situ Hydrous Perturbation" (Minerals 2015, 5, 507-526 Walid Oueslati and two others) describes X-ray diffraction (XRD). When using such an X-ray diffraction method, it is necessary to prevent exposure to radiation, which may complicate the work.

It is an object of the present disclosure to provide a hygroscopicity evaluation method capable of easily evaluating the hygroscopicity of a measurement target object and a water content evaluation method capable of easily evaluating the water content of a measurement target object.

A hygroscopicity evaluation method according to one aspect of the present disclosure is a hygroscopicity evaluation method for evaluating hygroscopicity of a measurement target object containing a clay mineral. The hygroscopicity evaluation method includes: a first step of preparing a first sample containing a first clay mineral as the clay mineral and a second sample containing a second clay mineral, which is the same as the first clay mineral, as the clay mineral; a second step of acquiring a first detection result for the first sample and a second detection result for the second sample by making a terahertz wave incident on each of the first and second samples and detecting the terahertz wave from each of the first and second samples; and a third step of evaluating the hygroscopicity of the measurement target object based on a first frequency characteristic of the first sample calculated from the first detection result and a second frequency characteristic of the second sample calculated from the second detection result. In the first step, at least one of the first and second samples is subjected to a water absorption/dehydration treatment. In the third step, a magnitude of the hygroscopicity of the measurement target object is evaluated based on a difference between a magnitude of a first peak of the first frequency characteristic in a reference frequency range and a magnitude of a second peak of the second frequency characteristic in the reference frequency range.

A water content evaluation method according to another aspect of the present disclosure is a water content evaluation method for evaluating a water content of a measurement target object containing a clay mineral. The water content evaluation method includes: a first step of preparing the measurement target object; a second step of acquiring a detection result for the measurement target object by making a terahertz wave incident on the measurement target object and detecting the terahertz wave from the measurement target object; and a third step of evaluating the water content of the measurement target object based on a frequency characteristic of the measurement target object calculated from the detection result. In the third step, the water content of the measurement target object is evaluated based on first reference information indicating a relationship between a magnitude of a peak of a frequency characteristic of a reference sample in a reference frequency range and a water content of the reference sample and a magnitude of a peak of the frequency characteristic of the measurement target object in the reference frequency range.

DETAILED DESCRIPTION

Figure 1:
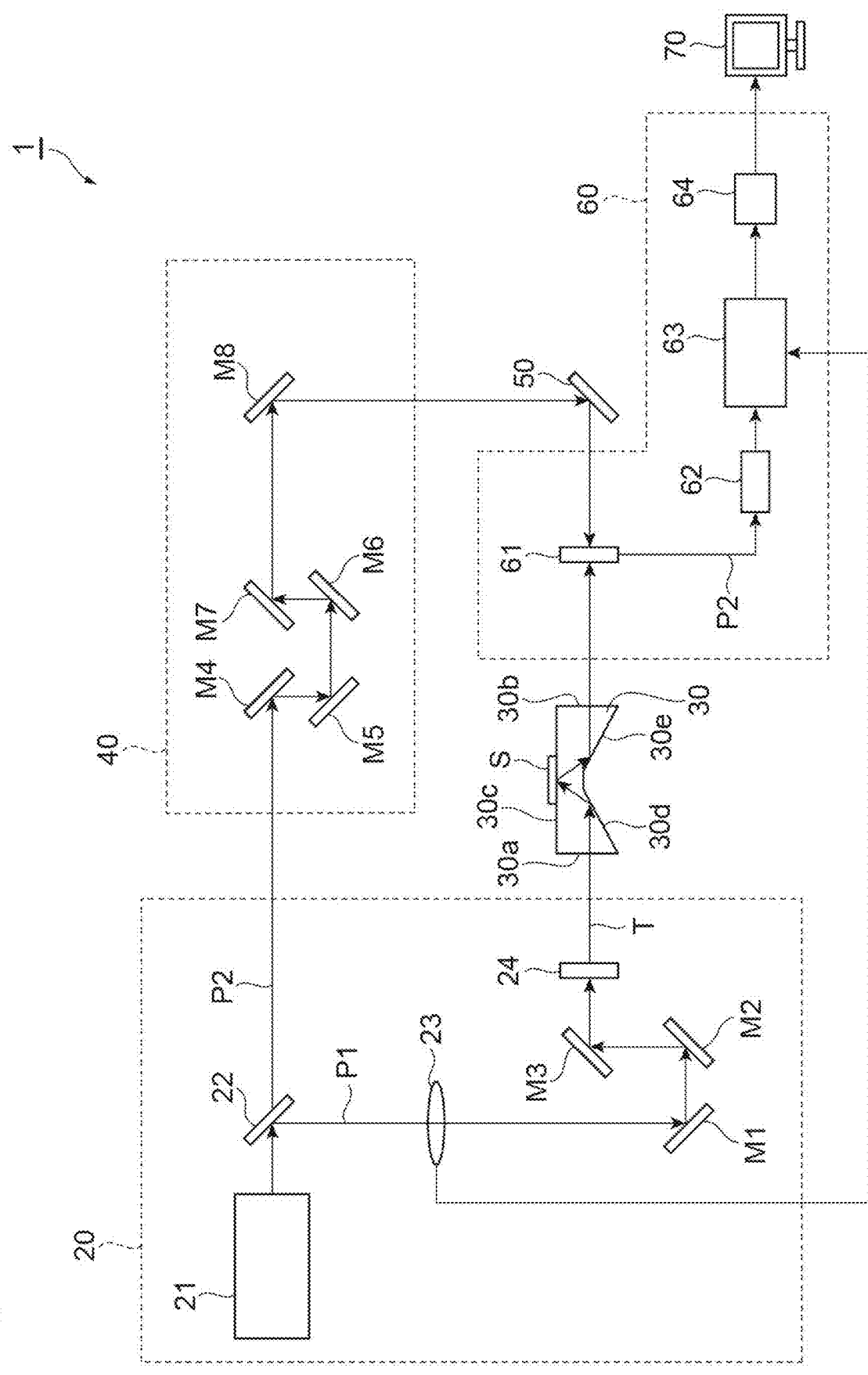
FIG. 1 is a configuration diagram of a spectrometer according to a first embodiment.

Hereinafter, embodiments of the present disclosure will be described in detail with reference to the diagrams. In addition, the same or equivalent portions in the diagrams are denoted by the same reference numerals, and repeated description thereof will be omitted.

First Embodiment

[Spectrometer]

As shown in FIG. 1, a spectrometer 1 according to a first embodiment includes an output unit 20, an arrangement unit 30, an adjustment unit 40, a reflection unit 50, a detection unit 60, and a processing unit 70. The spectrometer 1 is a device for performing attenuated total reflection spectroscopy (ATR) using terahertz waves.

The output unit 20 outputs a terahertz wave T. Specifically, the output unit 20 includes a light source 21, a splitter 22, a chopper 23, a plurality of mirrors M1 to M3, and a terahertz wave generating element 24. The light source 21 outputs light by pulse oscillation. For example, the light source 21 outputs pulsed laser light having a pulse width of approximately femtoseconds. That is, the light source 21 is a femtosecond pulsed laser light source.

The splitter 22 is, for example, a beam splitter. The splitter 22 splits the light output from the light source 21 into pump light P1 and probe light P2. The chopper 23 alternately repeats passing and blocking of the pump light P1 output from the splitter 22 at predetermined periods.

The mirrors M1 to M3 sequentially reflect the pump light P1 that has passed through the chopper 23. The pump light P1 that has passed through the chopper 23 is incident on the terahertz wave generating element 24 after being sequentially reflected by the mirrors M1 to M3. In the following description, the optical system of the pump light P1 from the splitter 22 to the terahertz wave generating element 24 will be referred to as a "pump optical system".

The terahertz wave generating element 24 outputs the terahertz wave T upon receiving the pump light P1 reflected by the mirror M3. The terahertz wave generating element 24 contains, for example, a nonlinear optical crystal (for example, ZnTe), a photoconductive antenna element (for example, an optical switch using GaAs), a semiconductor (for example, InAs), or a superconductor. When the terahertz wave generating element 24 contains a nonlinear optical crystal, the terahertz wave generating element 24 generates the terahertz wave T by a nonlinear optical phenomenon that occurs with the incidence of the pump light P1.

The terahertz wave T has intermediate properties between light waves and radio waves. The terahertz wave T is an electromagnetic wave having a frequency corresponding to an intermediate range between light waves and radio waves. The terahertz wave T has a frequency of about 0.01 THz to 100 THz. The terahertz wave T is generated at predetermined repetition periods, and has a pulse width of about several picoseconds. That is, the terahertz wave generating element 24 generates a pulsed light train including a plurality of terahertz wave T arranged at predetermined time intervals (pulse intervals). In the following description, the optical system of the terahertz wave T from the terahertz wave generating element 24 to a detector 61, which will be described later, will be referred to as a "terahertz wave optical system".

The arrangement unit 30 is, for example, a so-called aplanatic prism. The arrangement unit 30 has an incident surface 30a, an exit surface 30b, a reflecting surface 30c, a first sub-reflecting surface 30d, and a second sub-reflecting surface 30e. The incident surface 30a and the exit surface 30b are parallel to each other. The reflecting surface 30c is perpendicular to the incident surface 30a and the exit surface 30b. A measurement target object S is arranged on the reflecting surface 30c. The first sub-reflecting surface 30d and the second sub-reflecting surface 30e are surfaces of the arrangement unit 30 opposite to the reflecting surface 30c, and form a recess. A surface formed by the first sub-reflecting surface 30d and the second sub-reflecting surface 30e is recessed toward the reflecting surface 30c.

The arrangement unit 30 is transparent to the terahertz wave T output from the terahertz wave generating element 24. The refractive index of the arrangement unit 30 is higher than the refractive index of the measurement target object S. The material of the arrangement unit is, for example, silicon.

The terahertz wave T incident on the incident surface 30a of the arrangement unit 30 is sequentially reflected by the first sub-reflecting surface 30d, the reflecting surface 30c, and the second sub-reflecting surface 30e, and then output to the outside from the exit surface 30b. By detecting the attenuated reflectance of the evanescent wave leaking out when the terahertz wave T is totally reflected on the reflecting surface 30c, it is possible to acquire the information of the terahertz wave band regarding the measurement target object S.

The adjustment unit 40 has a plurality of mirrors M4 to M8. The probe light P2 output from the splitter 22 is sequentially reflected by the mirrors M4 to M8 and further reflected by the reflection unit 50 and then incident on the detector 61. The reflection unit 50 is a mirror. In the following description, the optical system of the probe light P2 from the splitter 22 to the detector 61 will be referred to as a "probe optical system".

In the adjustment unit 40, the mirrors M5 and M6 move to adjust the optical path length between the mirrors M4 and M5 and the optical path length between the mirrors M6 and M7. In this manner, the optical path length of the probe optical system is adjusted. The adjustment unit 40 adjusts the difference between the "optical path length obtained by adding the optical path length of the terahertz wave optical system from the terahertz wave generating element 24 to the detector 61 to the optical path length of the pump optical system from the splitter 22 to the terahertz wave generating element 24" and the "optical path length of the probe optical system from the splitter 22 to the detector 61".

The detection unit 60 detects the terahertz wave T output from the arrangement unit 30. Specifically, the detection unit 60 includes the detector 61, an I/V conversion amplifier 62, a lock-in amplifier 63, and an A/D converter 64. When the terahertz wave T output from the arrangement unit 30 and the probe light P2 reflected by the reflection unit 50 are incident on the detector 61, the detector 61 detects the correlation between the terahertz wave T and the probe light P2.

Specifically, the detector 61 includes a photoconductive antenna and the like. When the probe light P2 is incident on the detector 61, photocarriers are generated in the detector 61. When the terahertz wave T is incident on the detector 61 in which photocarriers are generated, the photocarriers flow according to the electric field of the terahertz wave T. As a result, the photocarriers are output from the detector 61 as a current. The amount of current output from the detector 61 depends on the electric field strength of the terahertz wave T.

The current output from the detector 61 is input to the I/V conversion amplifier 62. The I/V conversion amplifier 62 converts the current output from the detector 61 into a voltage and then amplifies the voltage and outputs the amplified voltage to the lock-in amplifier 63. The lock-in amplifier 63 synchronously detects the electrical signal output from the I/V conversion amplifier 62 at the repetition frequency of passing and blocking of the pump light P1 in the chopper 23. The A/D converter 64 converts the analog signal from the lock-in amplifier 63 into a digital signal. The signal output from the lock-in amplifier 63 has a value that depends on the electric field strength of the terahertz wave T. Thus, the detection unit 60 detects the correlation between the terahertz wave T and the probe light P2, and detects the electric field amplitude of the terahertz wave T.

When the optical path length of the probe optical system is adjusted by adjusting the optical path length between the mirrors M4 and M5 and the optical path length between the mirrors M6 and M7 in the adjustment unit 40, the timing difference between the probe light P2 and the terahertz wave T input to the detector 61 is adjusted. As described above, generally, the pulse width of the terahertz wave T is about picoseconds, while the pulse width of the probe light P2 is about femtoseconds. That is, the pulse width of the probe light P2 is several orders of magnitude narrower than that of the terahertz wave T. Therefore, by sweeping the incidence timing of the probe light P2 to the detector 61 by the adjustment unit 40, the time waveform of the electric field amplitude of the terahertz wave T (hereinafter, referred to as "electric field waveform") is obtained. Hereinafter, acquiring an electric field waveform by such a method will be simply referred to as "acquiring an electric field waveform".

When the incidence timing of the probe light P2 is swept once, the electric field waveform (detection result) of one terahertz wave T corresponding to a predetermined time is obtained. The incidence timing of the probe light P2 to the detector 61 may be swept multiple times by the adjustment unit 40. In this case, a plurality of electric field waveforms are obtained. That is, the detection unit 60 may acquire data including a plurality of electric field waveforms corresponding to a plurality of times separated from each other.

The processing unit 70 acquires information regarding the measurement target object S based on the electric field waveform acquired by the detection unit 60. Specifically, the processing unit 70 calculates frequency characteristics corresponding to the electric field waveform based on the signal output from the A/D converter 64. The frequency characteristics refer to optical characteristics with respect to frequency. The optical characteristics include light absorbency, light reflectivity, light transmittance, and the like. In the present embodiment, the optical characteristic is, for example, an absorption coefficient for terahertz waves. In the present embodiment, the frequency characteristic is, for example, an absorption spectrum. The processing unit 70 acquires information regarding the measurement target object S based on the frequency characteristics. The processing unit 70 is configured to include a central processing unit (CPU), a read only memory (ROM), a random access memory (RAM), and the like.

[Peripheral Structures of Arrangement Unit]

Figure 2:
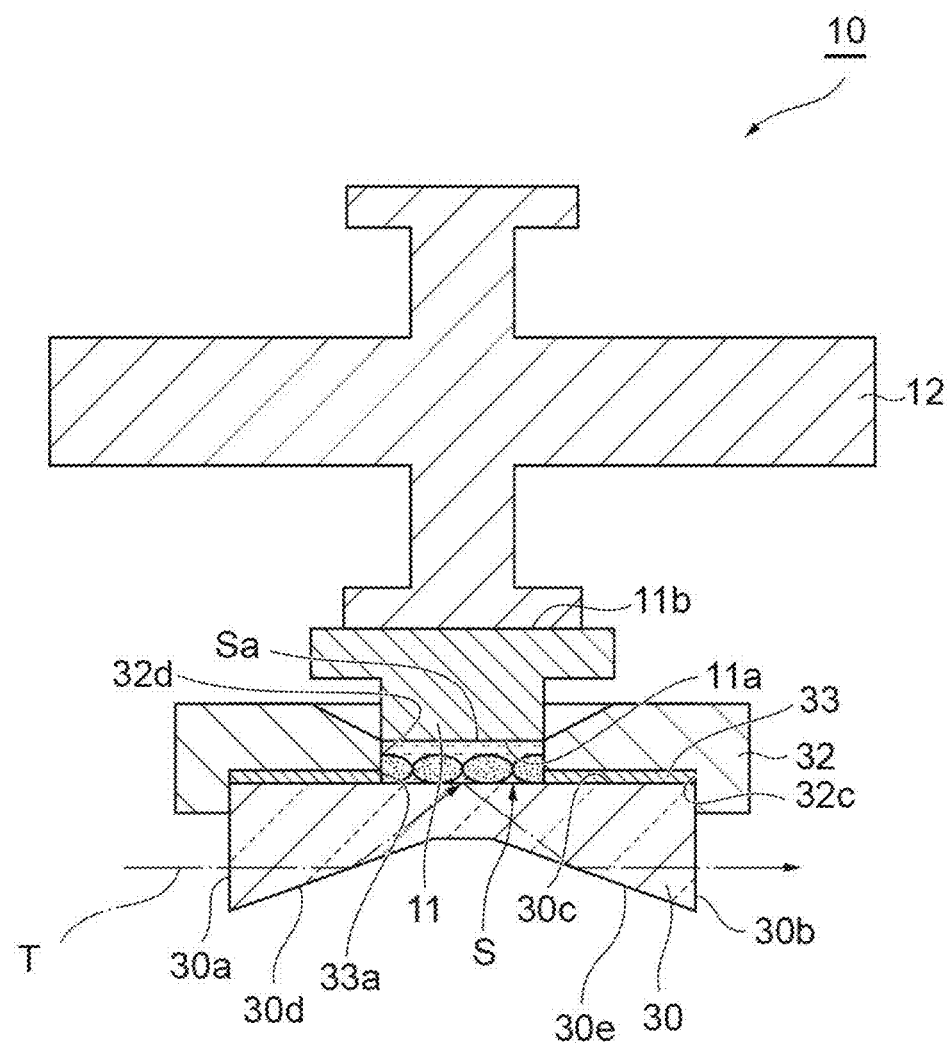
FIG. 2 is a cross-sectional view of a peripheral structure of an arrangement unit shown in FIG. 1.

As shown in FIG. 2, the spectrometer 1 further includes a frame 32, a sheet 33, and a pressure application device 10 as peripheral structures of the arrangement unit 30. In addition, in FIG. 1, the illustration of the frame 32, the sheet 33, and the pressure application device 10 is omitted.

A recess 32c is formed in the frame 32. The frame 32 is arranged on the reflecting surface 30c so that a part of the arrangement unit 30 including the reflecting surface 30c and the sheet 33 are located within the recess 32c. A through hole 32d and a through hole 33a are formed in the frame 32 and the sheet 33, respectively. Each of the through holes 32d and 33a has, for example, a circular shape when viewed from the Z-axis direction. The measurement target object S is arranged on the reflecting surface 30c inside the through holes 32d and 33a. The shape of each of the through holes 32d and 33a is not limited. Each of the through holes 32d and 33a may have, for example, a rectangular shape when viewed from the Z-axis direction.

The pressure application device 10 has a contact unit 11 and a biasing unit 12. A part of the contact unit 11 enters the through hole 32d, so that a distal end surface 11a of the contact unit 11 is in contact with a surface Sa of the measurement target object S. A portion of the contact unit 11 that enters the through hole 32d has, for example, a cylindrical shape. The shape of the contact unit 11 is not limited. A portion of the contact unit 11 that enters the through hole 32d may have, for example, a rectangular parallelepiped shape. The biasing unit 12 applies a load to a rear end surface 11b of the contact unit 11. The biasing unit 12 has, for example, a pressing jig. The pressing jig is, for example, a torque driver. The biasing unit 12 can apply a constant load to the contact unit 11. The load is transmitted to the surface Sa of the measurement target object S through the contact unit 11.

The pressure application device 10 is configured to be able to adjust the magnitude of the pressure applied to the measurement target object S. In the pressure application device 10, the load applied to the contact unit 11 can be adjusted by managing the torque of the torque driver of the biasing unit 12, for example. In the present embodiment, the pressure application device 10 applies a substantially constant pressure to the measurement target object S. Specifically, as described above, the spread of the measurement target object S along a direction parallel to the reflecting surface 30c is regulated by the frame 32. Therefore, when the load from the biasing unit 12 is transmitted to the measurement target object S through the contact unit 11, the measurement target object S is pressed inside the frame 32. As a result, pressure is applied to the measurement target object S. Here, since the magnitude of the torque of the torque driver of the biasing unit 12 is constant, a constant load is transmitted to the measurement target object S. Therefore, a constant pressure is applied to the measurement target object S. In addition, "applying a substantially constant pressure" means applying a pressure within a range of ±5% with respect to the reference value.

[Hygroscopicity Evaluation Method]

Figure 3:
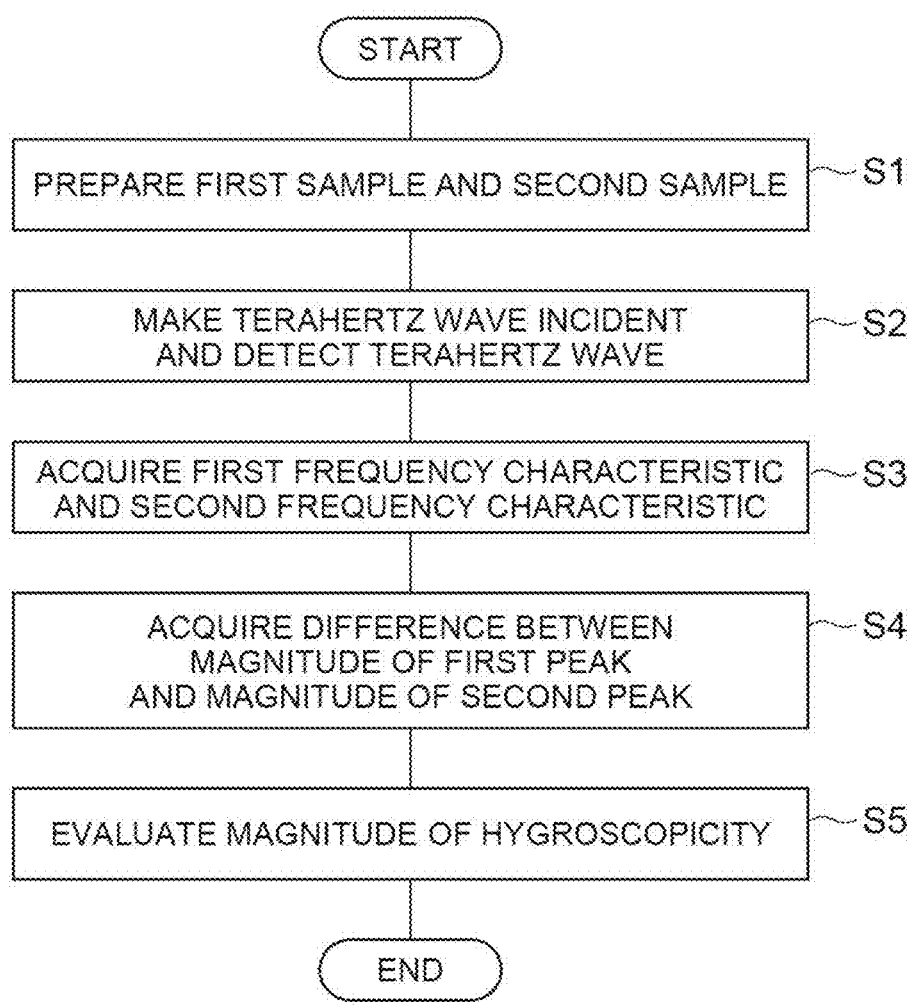
FIG. 3 is a flowchart of a hygroscopicity evaluation method according to the first embodiment.

Next, a hygroscopicity evaluation method using the spectrometer 1 will be described. The hygroscopicity evaluation method according to the present embodiment is a method of evaluating the hygroscopicity of the measurement target object S containing clay minerals. First, a reference electric field waveform is acquired by making the terahertz wave T incident on the incident surface 30a in a state in which the reflecting surface 30c is exposed (a state in which the measurement target object S and the like are not arranged on the reflecting surface 30c). Then, as shown in FIG. 3, a first sample and a second sample are prepared (step S1).

The first sample contains the same clay mineral (first clay mineral) as that of the measurement target object S. The second sample contains the same clay mineral (second clay mineral) as that of the measurement target object S. That is, the first sample and the second sample contain the same clay mineral. The water contents of the first sample and the second sample are different from each other. In the present embodiment, the term "water content" refers to the ratio of the amount of water present in the crystal structure of the clay mineral to the clay mineral. As an example, the water content is a value obtained by dividing the weight of water present in the crystal structure of the clay mineral by the weight of the clay mineral.

In step S1, the first sample is subjected to first water absorption/dehydration treatment, and the second sample is subjected to second water absorption/dehydration treatment. The conditions of the first water absorption/dehydration treatment and the conditions of the second water absorption/dehydration treatment are different from each other. The first water absorption/dehydration treatment and the second water absorption/dehydration treatment are treatments for making the water content of the first sample and the water content of the second sample different from each other. The first water absorption/dehydration treatment is a treatment for setting the water content of the first sample to a predetermined value. The second water absorption/dehydration treatment is a treatment for setting the water content of the second sample to a value different from the water content of the first sample. The water absorption/dehydration treatment is performed by a drying treatment device including, for example, a dryer and a vacuum pump, or by a wet treatment device including, for example, a desiccator.

The first water absorption/dehydration treatment is, for example, a treatment for reducing the water content of the first sample. The first water absorption/dehydration treatment is, for example, a drying treatment using a drying treatment device. The second water absorption/dehydration treatment is, for example, a treatment for increasing the water content of the second sample. The second water absorption/dehydration treatment is, for example, a wet treatment using a wet treatment device. The water content of the second sample is assumed to be larger than the water content of the first sample. In addition, if the water content of the first sample and the water content of the second sample can be made different, either one of the first sample and the second sample may not be subjected to the water absorption/dehydration treatment.

As the first sample, the measurement target object S subjected to the first water absorption/dehydration treatment may be used. As the second sample, the measurement target object S subjected to the second water absorption/dehydration treatment may be used. That is, the first sample and the second sample may be the measurement target objects S having different water contents. Step S1 corresponds to the first step of the hygroscopicity evaluation method.

Then, the first sample is placed in the through hole 32d of the frame 32 arranged on the reflecting surface 30c. Then, a substantially constant pressure is applied to the first sample. Specifically, first, the contact unit 11 is arranged in the through hole 32d of the frame 32. Then, the biasing unit 12 is arranged on the rear end surface 11b of the contact unit 11 to adjust the torque of the torque driver. In this manner, a substantially constant pressure is applied to the first sample.

Then, the terahertz wave T is made incident on the first sample, and the terahertz wave T from the first sample is detected (step S2). As a result, the electric field waveform (first detection result) of the first sample is acquired. Thus, in step S2, the terahertz wave attenuated total reflection spectroscopy is used. Step S2 corresponds to the second step of the hygroscopicity evaluation method. Then, the frequency characteristic of the first sample is acquired (step S3). Specifically, the first frequency characteristic of the first sample is calculated based on the reference electric field waveform and the electric field waveform of the first sample. As for the second sample, similarly to the first sample, the electric field waveform of the second sample is acquired, and the second frequency characteristic of the second sample is calculated. That is, steps S1 to S3 are executed for each of the first sample and the second sample.

Figure 4:
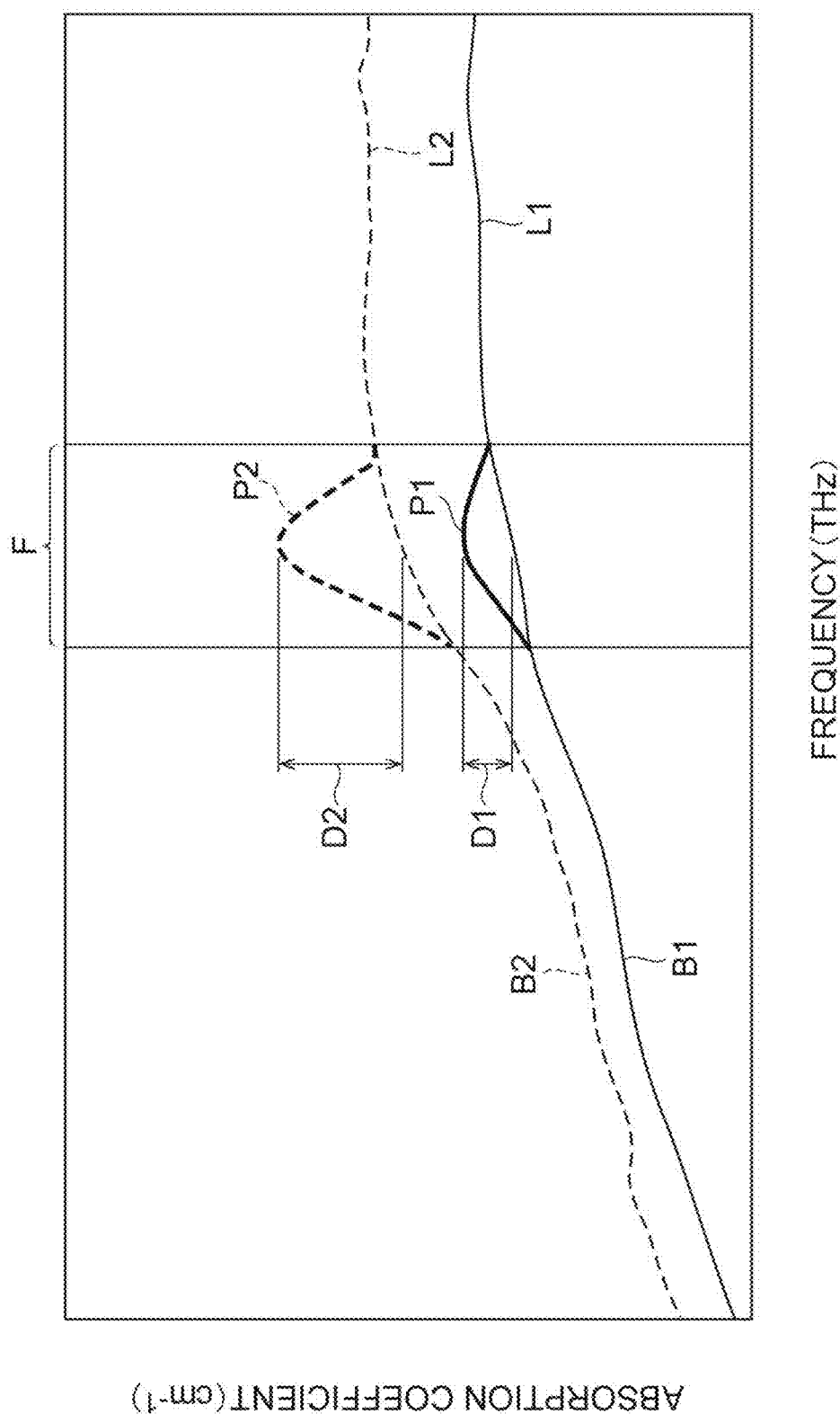
FIG. 4 is a diagram showing an example of the frequency characteristic of each of a first sample and a second sample.

FIG. 4 is a diagram showing the frequency characteristic of each of the first sample and the second sample for the measurement target object S in one example. As shown in FIG. 4, the first frequency characteristic L1 of the first sample includes a first peak P1 in a reference frequency range F. The second frequency characteristic L2 of the second sample includes a second peak P2 in the reference frequency range F.

The "peak" of the frequency characteristic refers to a portion of the frequency characteristic where the rate of change of the optical characteristic changes as the frequency changes. As an example, assuming that the horizontal axis indicates a frequency and the vertical axis indicates an optical characteristic, when a point indicating an optical characteristic corresponding to a predetermined frequency between one frequency and another frequency is located on one side or the other side with respect to a baseline connecting one point indicating one optical characteristic corresponding to one frequency to another point indicating another optical characteristic corresponding to another frequency, a portion between one frequency and another frequency in the frequency characteristic is the peak. The baseline may be a straight line or a curve. As another example, assuming that the horizontal axis indicates a frequency and the vertical axis indicates an optical characteristic, when there is a portion of the frequency characteristic where the rate of change of the optical characteristic changes from a positive number to a negative number as the frequency changes or a portion of the frequency characteristic where the rate of change of the optical characteristic changes from a negative number to a positive number as the frequency changes, the portion is the peak of the frequency characteristic.

The first peak P1 of the first frequency characteristic L1 is located on one side of a baseline B1. The second peak P2 of the second frequency characteristic L2 is located on one side of a baseline B2. The magnitude of the first peak P1 and the magnitude of the second peak P2 are different from each other. The magnitude of the second peak P2 is larger than the magnitude of the first peak P1.

The "magnitude of the peak" refers to the degree to which the peak is away from the baseline. When the peak is far away from the baseline, the magnitude of the peak is large.

When the peak is slightly away from the baseline, the magnitude of the peak is small. When the maximum distance between the peak and the baseline is large, the magnitude of the peak is large. When the maximum distance between the peak and baseline is small, the magnitude of the peak is small. A maximum distance D2 between the second peak P2 and the baseline B2 of the second frequency characteristic L2 is larger than a maximum distance D1 between the first peak P1 and the baseline B1 of the first frequency characteristic L1. In addition, the frequencies corresponding to the maximum distance D1 and the maximum distance D2 may be the same or different.

When the area between the peak and the baseline is large, the magnitude of the peak is large. When the area between the peak and the baseline is small, the magnitude of the peak is small. The area between the second peak P2 and the baseline B2 of the second frequency characteristic L2 is larger than the area between the first peak P1 and the baseline B1 of the first frequency characteristic L1.

Figure 5:
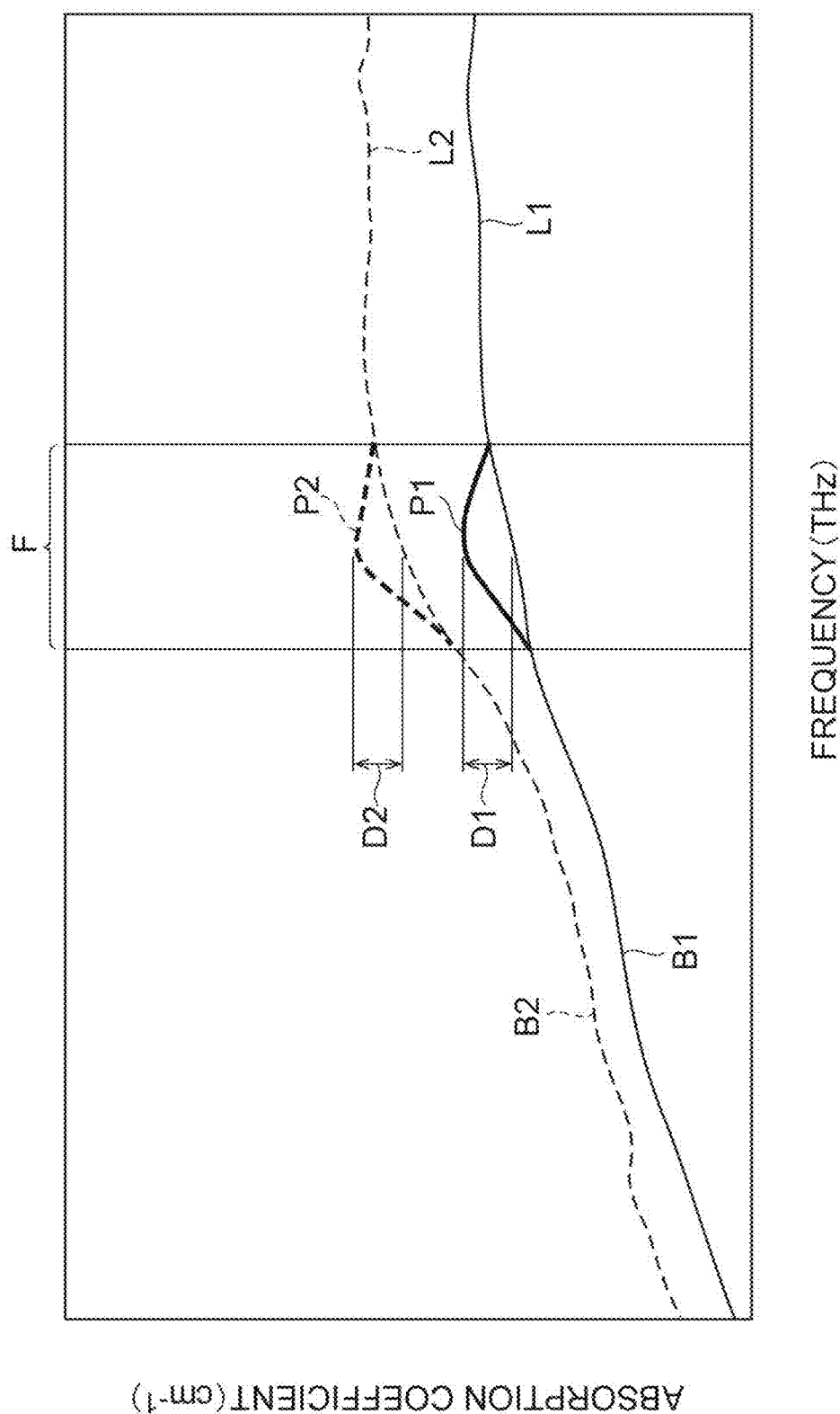
FIG. 5 is a diagram showing another example of the frequency characteristic of each of a first sample and a second sample.

FIG. 5 is a diagram showing the frequency characteristic of each of the first sample and the second sample for the measurement target object S in another example. The conditions of the first water absorption/dehydration treatment applied to the first sample for the measurement target object S in another example are the same as the conditions of the first water absorption/dehydration treatment applied to the first sample for the measurement target object S in one example. The conditions of the second water absorption/dehydration treatment applied to the second sample for the measurement target object S in another example are the same as the conditions of the second water absorption/dehydration treatment applied to the second sample for the measurement target object S in one example.

As shown in FIG. 5, the magnitude of the first peak P1 of the first frequency characteristic L1 and the magnitude of the second peak P2 of the second frequency characteristic L2 are approximately the same. The maximum distance D1 between the first peak P1 and the baseline B1 of the first frequency characteristic L1 and the maximum distance D2 between the second peak P2 and the baseline B2 of the second frequency characteristic L2 are approximately the same. The area between the first peak P1 and the baseline B1 of the first frequency characteristic L1 and the area between the second peak P2 and the baseline B2 of the second frequency characteristic L2 are approximately the same.

Then, the hygroscopicity of the measurement target object S is evaluated based on the first frequency characteristic L1 and the second frequency characteristic L2. Specifically, as shown in FIG. 3, the difference between the magnitude of the first peak P1 of the first frequency characteristic L1 in the reference frequency range F and the magnitude of the second peak P2 of the second frequency characteristic L2 in the reference frequency range F is acquired (step S4). Then, the magnitude of the hygroscopicity of the measurement target object S is evaluated based on the difference acquired in step S4 (step S5).

Specifically, if the difference acquired in step S4 is relatively large, it is evaluated that the hygroscopicity of the measurement target object S is relatively large. If the difference acquired in step S4 is relatively small, it is evaluated that the hygroscopicity of the measurement target object S is relatively small. For example, the difference between the magnitude of the first peak P1 and the magnitude of the second peak P2 shown in FIG. 4 is larger than the difference between the magnitude of the first peak P1 and the magnitude of the second peak P2 shown in FIG. 5. Therefore, the magnitude of the hygroscopicity of the measurement target object S in one example is larger than the magnitude of the hygroscopicity of the measurement target object S in another example.

Thus, in step S5, by comparing the difference between the magnitude of the first peak P1 and the magnitude of the second peak P2 for each of the different measurement target objects S, it is evaluated whether or not the magnitude of the hygroscopicity of the measurement target object S is relatively large. In step S5, it is evaluated that the larger the difference between the magnitude of the first peak P1 and the magnitude of the second peak P2, the larger the magnitude of the hygroscopicity of the measurement target object S.

The "magnitude of the hygroscopicity" refers to the ability to absorb water. For example, when two samples are subjected to water absorption treatment under the same conditions (for example, the same temperature, humidity, and time), if one sample absorbs a larger amount of water than the other sample, the hygroscopicity of one sample is said to be larger than the hygroscopicity of the other sample. Steps S4 and S5 correspond to the third step of the hygroscopicity evaluation method.

A first example will be described with reference to FIGS. 6 and 7. In the first example, the hygroscopicity of the measurement target object S containing montmorillonite as a clay mineral was evaluated. In the first example, steps S1 to S3 were performed for the first, second, and third samples containing montmorillonite as a clay mineral. The first sample was prepared by drying a sample of the measurement target object S using the drying treatment device described above. The second sample was prepared by leaving a sample of the measurement target object S unattended. That is, the second sample is a sample of the measurement target object S that has not been subjected to the water absorption/dehydration treatment. The water content of the second sample is assumed to be larger than the water content of the first sample. The third sample was prepared by wetting a sample of the measurement target object S using the wet treatment device described above. The water content of the third sample is assumed to be larger than the water content of the second sample. Samples of the measurement target object S were obtained, for example, from the manufacturer. In this example, each sample of the measurement target object S is montmorillonite with relatively high purity.

Figure 6:
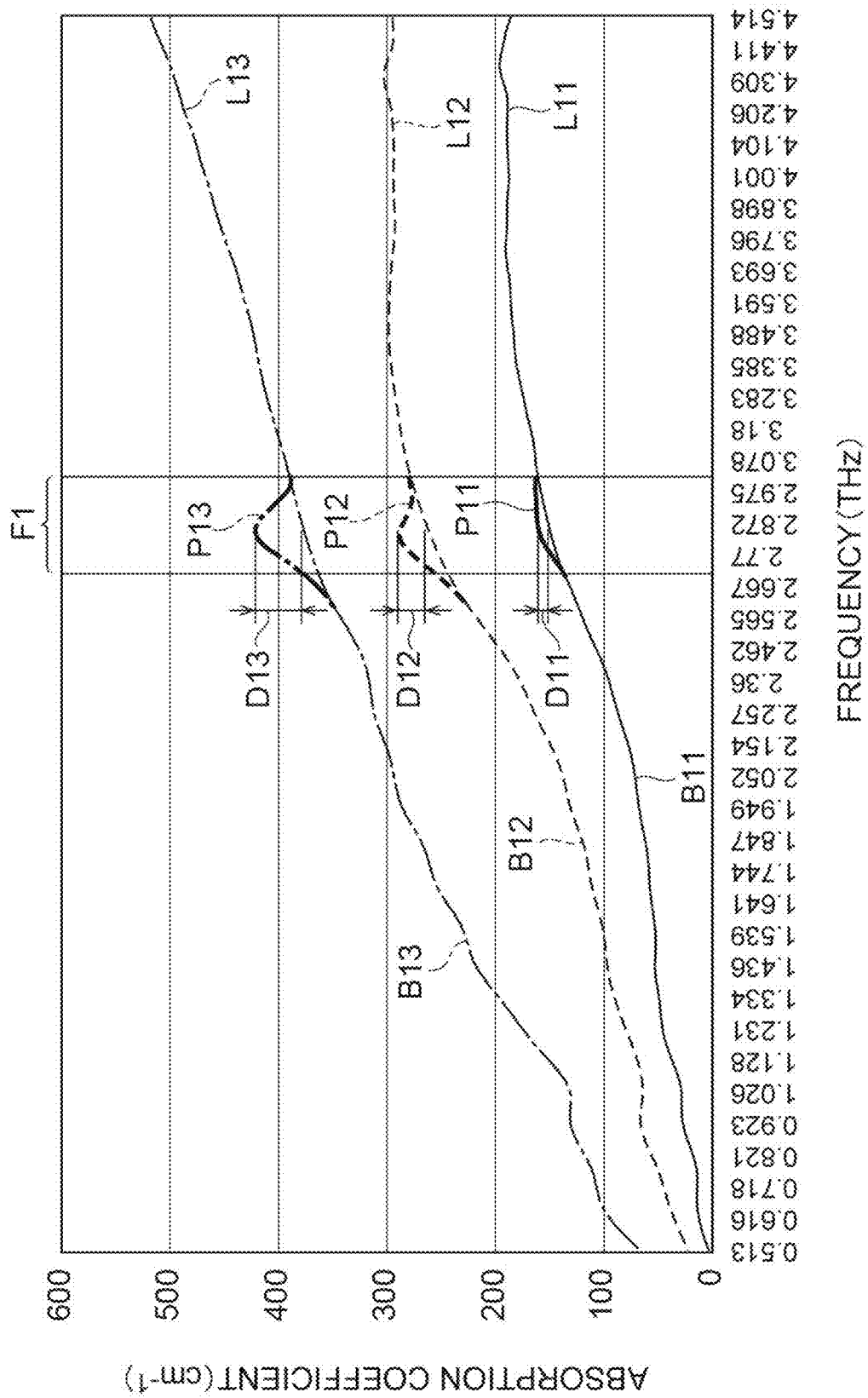
FIG. 6 is a diagram showing the frequency characteristic of each of a first sample, a second sample, and a third sample containing a clay mineral in a first example.

FIG. 6 is a diagram showing the frequency characteristic of each of the first, second, and third samples containing montmorillonite. As shown in FIG. 6, the first frequency characteristic L11 of the first sample includes a first peak P11 in a reference frequency range F1. The second frequency characteristic L12 of the second sample includes a second peak P12 in the reference frequency range F1. The third frequency characteristic L13 of the third sample includes a third peak P13 in the reference frequency range F1. The reference frequency range F1 is 2.7 THz to 3.0 THz.

The magnitude of the first peak P11, the magnitude of the second peak P12, and the magnitude of the third peak P13 are different from each other. The magnitude of the second peak P12 is larger than the magnitude of the first peak P11. The magnitude of the third peak P13 is larger than the magnitude of the second peak P12. A maximum distance D12 between the second peak P12 and the baseline B12 is larger than a maximum distance D11 between the first peak P11 and the baseline B11. A maximum distance D13 between the third peak P13 and the baseline B13 is larger than the maximum distance D12 between the second peak P12 and the baseline B12. The area between the second peak P12 and the baseline B12 is larger than the area between the first peak P11 and the baseline B11. The area between the third peak P13 and the baseline B13 is larger than the area between the second peak P12 and the baseline B12.

Figure 7:
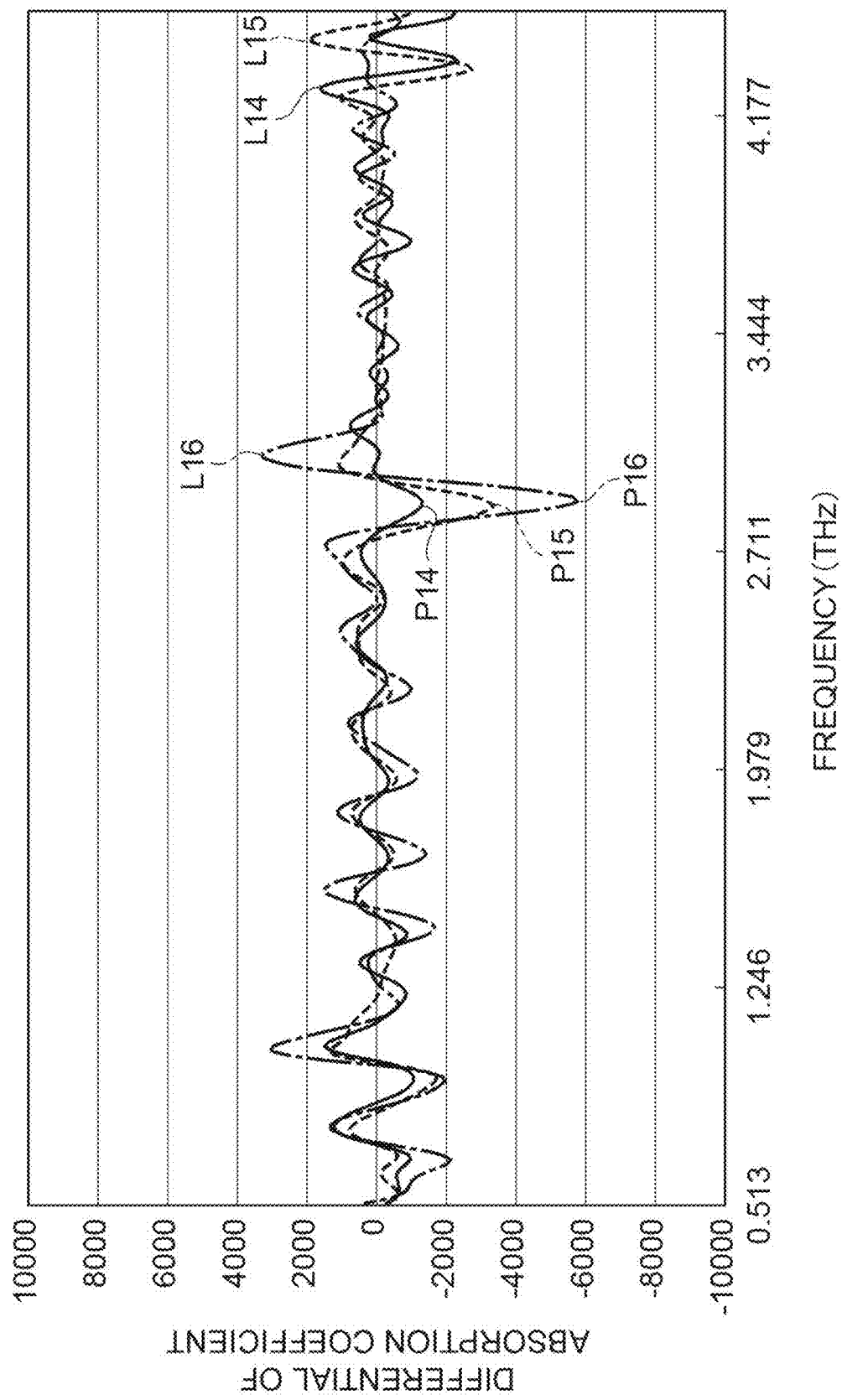
FIG. 7 is a diagram showing the differential of each frequency characteristic shown in FIG. 6.

FIG. 7 is a diagram showing the differential of each of the frequency characteristics L11, L12, and L13 shown in FIG. 6. As shown in FIG. 7, the peak P15 of the differential L15 of the second frequency characteristic L12 is larger than the peak P14 of the differential L14 of the first frequency characteristic L11. The peak P16 of the differential L16 of the third frequency characteristic L13 is larger than the peak P15 of the differential L15 of the second frequency characteristic L12. According to the differentials L14, L15, and L16, the magnitude of the first peak P11, the magnitude of the second peak P12, and the magnitude of the third peak P13 can be easily grasped by eliminating the influence of the baselines B1, B2, and B3.

In addition, the first frequency characteristic L11, the second frequency characteristic L12, and the third frequency characteristic L13 include the first peak P11, the second peak P12, and the third peak P13, respectively, in the same reference frequency range F1. Therefore, the crystal forms of the clay minerals (montmorillonite) of the first sample, the second sample, and the third sample are estimated to be the same. When the crystal forms of the clay minerals of the first sample, the second sample, and the third sample are different, the reference frequency ranges of the first sample, the second sample, and the third sample are estimated to be also different. In addition, since montmorillonite has a layered crystal structure, the strength of hydrogen bonding increases when water enters between the layers. As a result, it is estimated that molecular vibration is induced to increase the magnitude of the peak. In addition, in industry, it is often required to grasp the amount of water that has entered the crystal structure as the water retention capacity.

A second example will be described with reference to FIGS. 8 and 9. In the second example, the hygroscopicity of the measurement target object S containing kaolinite as a clay mineral was evaluated. In the second example, steps S1 to S3 were performed for the first, second, and third samples containing kaolinite as a clay mineral. Each of the first sample, the second sample, and the third sample was prepared by drying, neglecting, or wetting the sample of the measurement target object S as described above. Samples of the measurement target object S were obtained, for example, from the manufacturer. In this example, each sample of the measurement target object S is kaolinite with relatively high purity.

Figure 8:
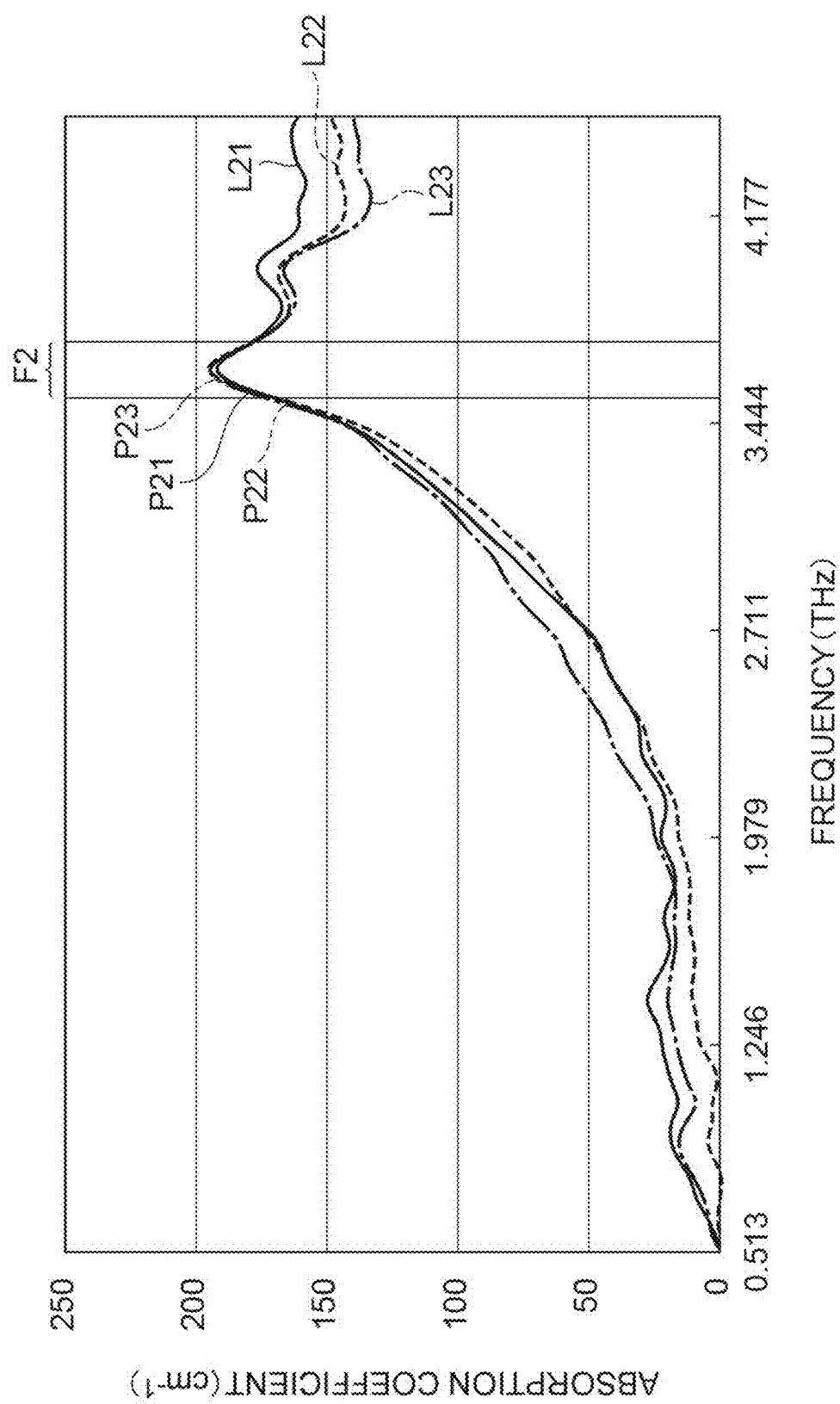
FIG. 8 is a diagram showing the frequency characteristic of each of a first sample, a second sample, and a third sample in a second example.

FIG. 8 is a diagram showing the frequency characteristic of each of the first, second, and third samples containing kaolinite. As shown in FIG. 8, the first frequency characteristic L21 of the first sample includes a first peak P21 in a reference frequency range F2. The second frequency characteristic L22 of the second sample includes a second peak P22 in the reference frequency range F2. The third frequency characteristic L23 of the third sample includes a third peak P23 in the reference frequency range F2. The reference frequency range F2 is 3.5 THz to 3.7 THz. The magnitude of the first peak P21, the magnitude of the second peak P22, and the magnitude of the third peak P23 are approximately the same.

The difference between the magnitude of the first peak P11 and the magnitude of the second peak P12 (see FIG. 6) is larger than the difference between the magnitude of the first peak P21 and the magnitude of the second peak P22 (see FIG. 8). The difference between the magnitude of the first peak P11 and the magnitude of the third peak P13 (see FIG. 6) is larger than the difference between the magnitude of the first peak P21 and the magnitude of the third peak P23 (see FIG. 8). The difference between the magnitude of the second peak P12 and the magnitude of the third peak P13 (see FIG. 6) is larger than the difference between the magnitude of the second peak P22 and the magnitude of the third peak P23 (see FIG. 8).

Figure 9:
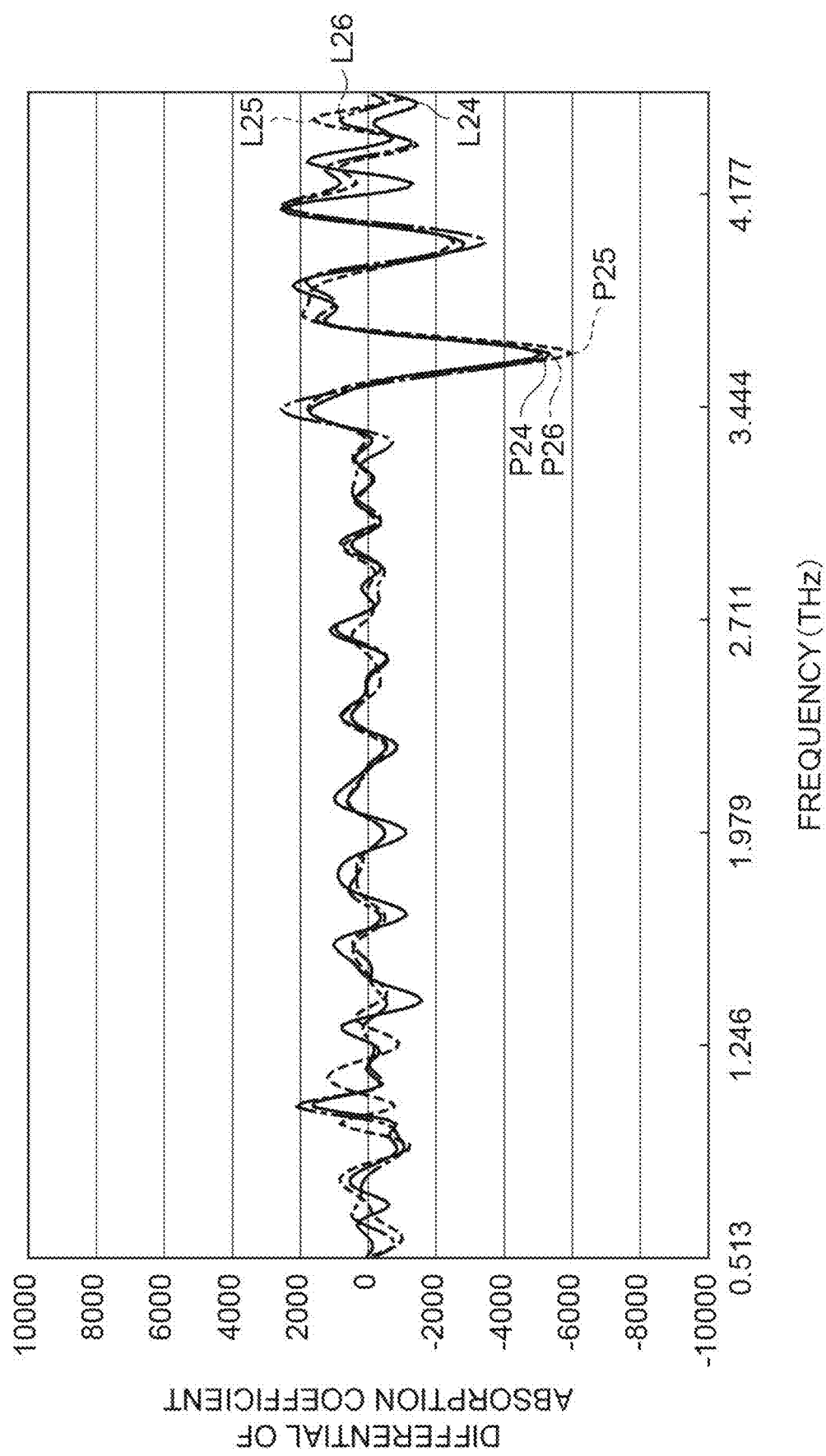
FIG. 9 is a diagram showing the differential of each frequency characteristic shown in FIG. 8.

FIG. 9 is a diagram showing the differential of each of the frequency characteristics L21, L22, and L23 shown in FIG. 8. As shown in FIG. 9, the peak P24 of the differential L24 of the first frequency characteristic L21, the peak P25 of the differential L25 of the second frequency characteristic L22, and the peak P26 of the differential L26 of the third frequency characteristic L23 are approximately the same.

In the present embodiment, since the difference among the magnitudes of the peaks P11, P12, and P13 when the clay mineral is montmorillonite is larger than the difference among the magnitudes of the peaks P21, P22, and P23 when the clay mineral is kaolinite, it can be seen that the magnitude of the hygroscopicity of the measurement target object S containing montmorillonite is larger than the magnitude of the hygroscopicity of the measurement target object S containing kaolinite.

In addition, the first frequency characteristic L21, the second frequency characteristic L22, and the third frequency characteristic L23 include the first peak P21, the second peak P22, and the third peak P23, respectively, in the same reference frequency range F2. Therefore, the crystal forms of the clay minerals (kaolinite) of the first sample, the second sample, and the third sample are estimated to be the same. When the crystal forms of the clay minerals of the first sample, the second sample, and the third sample are different, the reference frequency ranges of the first sample, the second sample, and the third sample are estimated to be also different.

[Functions and Effects of Hygroscopicity Evaluation Method]

As described above, in the hygroscopicity evaluation method, in the second step, by using the terahertz wave T, a first detection result for the first sample containing the first clay mineral and a second detection result for the second sample containing the second clay mineral that is the same as the first clay mineral are acquired. In addition, in the first step, the first sample is subjected to the first water absorption/dehydration treatment, and the second sample is subjected to the second water absorption/dehydration treatment. In the third step, the magnitude of the hygroscopicity of the measurement target object S is evaluated based on the difference between the magnitude of the first peak P1 of the first frequency characteristic L1 in the reference frequency range F and the magnitude of the second peak P2 of the second frequency characteristic L2 in the reference frequency range F. In this manner, by using the terahertz wave T, the hygroscopicity of the measurement target object S can be evaluated, for example, without chemical reaction (non-destructively) of the measurement target object S and without requiring prevention of exposure to radiation. Therefore, according to this hygroscopicity evaluation method, it is possible to easily evaluate the hygroscopicity of the measurement target object S.

The inventors of the present application hypothesized that the problems of various methods, such as the Karl Fischer titration or the X-ray diffraction method described above, could be solved by using terahertz waves. Therefore, the inventors of the present application evaluated the hygroscopicity of each sample containing montmorillonite and each sample containing kaolinite by irradiating the samples with terahertz waves as in the first and second examples. As a result, for samples containing montmorillonite, changes in the magnitude of the peak of the frequency characteristic in the reference frequency range due to differences in the conditions of the water absorption/dehydration treatment were observed, but for samples containing kaolinite, no such changes were observed. Based on these results, the inventors of the present application have found that samples containing montmorillonite have high hygroscopicity, while samples containing kaolinite have low hygroscopicity. In other words, the inventors of the present application have succeeded in solving the problems of various methods, such as the Karl Fischer titration or the X-ray diffraction method, by using terahertz waves.

The clay mineral is montmorillonite or kaolinite. Therefore, it is possible to evaluate the hygroscopicity of the measurement target object S containing montmorillonite or kaolinite as a clay mineral.

In the second step, the terahertz wave attenuated total reflection spectroscopy is used. Therefore, it is possible to easily and reliably evaluate the hygroscopicity of the measurement target object S.

[Water Content Evaluation Method]

Figure 10:
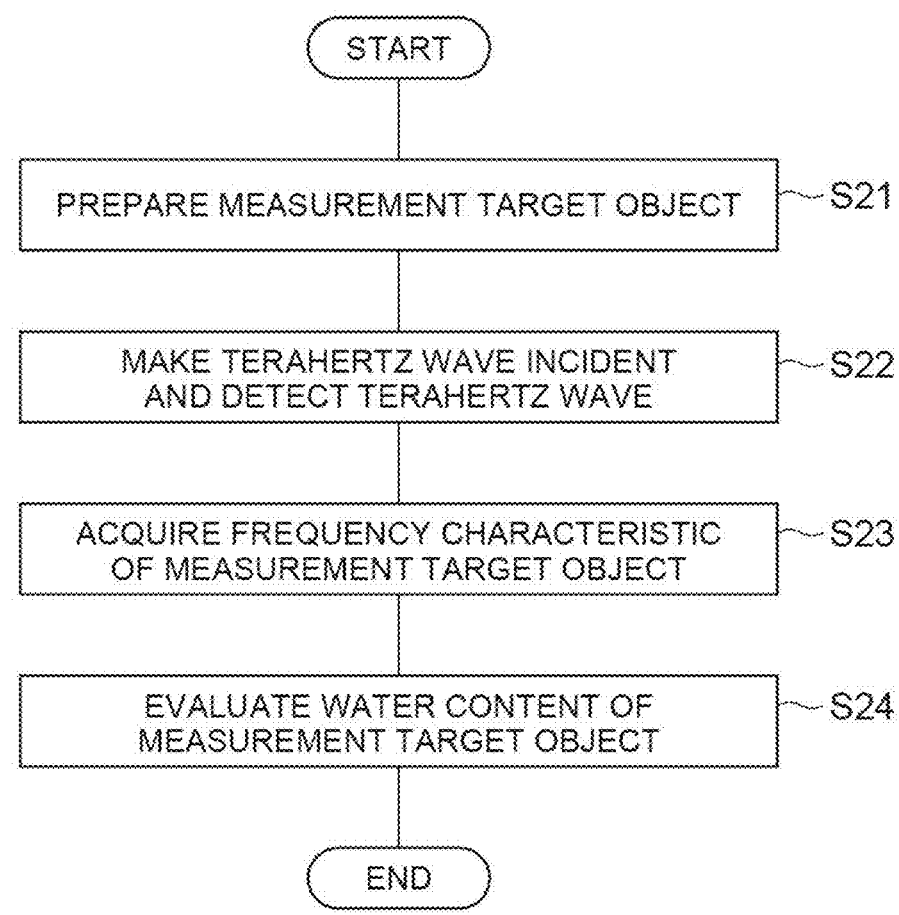
FIG. 10 is a flowchart of a water content evaluation method according to the first embodiment.

Next, a water content evaluation method using the spectrometer 1 will be described. The water content evaluation method according to the present embodiment is a method of evaluating the water content of the measurement target object S containing a hygroscopic clay mineral. First, as shown in FIG. 10, the measurement target object S selected based on the difference between the magnitude of the first peak P1 in the reference frequency range F and the magnitude of the second peak P2 in the reference frequency range F is prepared (step S21). In step S21, for example, the measurement target object S evaluated as having relatively high hygroscopicity in step S5 is prepared. In the present embodiment, as an example, the measurement target object S containing montmorillonite as a clay mineral is prepared. Step S21 corresponds to each of the fourth step of the hygroscopicity evaluation method and the first step of the water content evaluation method.

Then, the terahertz wave T is made incident on the measurement target object S, and the terahertz wave T from the measurement target object S is detected (step S22). As a result, the electric field waveform (detection result) of the measurement target object S is acquired. Thus, in step S22, the terahertz wave attenuated total reflection spectroscopy is used. Step S22 corresponds to each of the fifth step of the hygroscopicity evaluation method and the second step of the water content evaluation method.

Then, the frequency characteristic of the measurement target object S is acquired (step S23). Specifically, based on the reference electric field waveform and the electric field waveform of the measurement target object S, the frequency characteristic of the measurement target object S is calculated. Then, the water content of the measurement target object S is evaluated based on the frequency characteristic of the measurement target object S (step S24). In step S24, the water content of the measurement target object S is evaluated based on reference information (first reference information) and the magnitude of the peak of the frequency characteristic of the measurement target object S in the reference frequency range. The reference information is information indicating the relationship between the magnitude of the peak of the frequency characteristic of the reference sample in the reference frequency range and the water content of the reference sample. The reference sample contains the same clay mineral as the clay mineral of the measurement target object S. In the present embodiment, the reference sample is montmorillonite with relatively high purity. The reference sample may be a sample of the measurement target object S.

Figure 11:
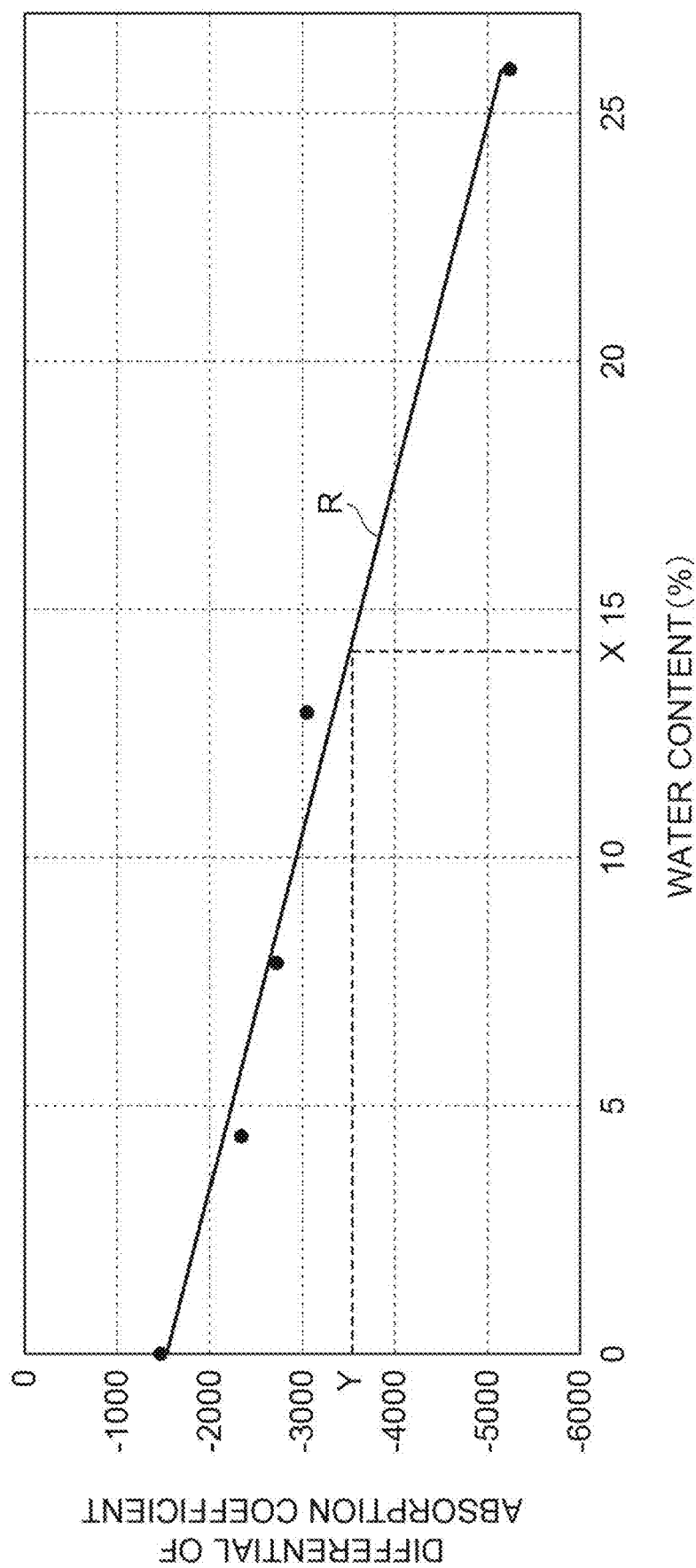
FIG. 11 is a diagram showing first reference information according to the first embodiment.

As shown in FIG. 11, assuming that the horizontal axis indicates the water content of the reference sample and the vertical axis indicates the magnitude of the peak of the frequency characteristic of the reference sample in the reference frequency range, reference information R indicates the correlation between the water content of the reference sample and the magnitude of the peak. As the magnitude of the peak, for example, the differential value (for example, see the peaks P14, P15, P16, and the like in FIG. 7) of the frequency characteristic of the reference sample in the reference frequency range is used. Specifically, as the magnitude of the peak, for example, the maximum absolute value of the differential value is used. In the present embodiment, the reference information R is created by using the five such maximum values. In the present embodiment, the reference information R is calculated by performing regression analysis with the magnitude of the peak as a dependent variable and the water content as an independent variable. The regression analysis may be, for example, linear regression or nonlinear regression.

As the magnitude of the peak, for example, a value corresponding to the distance (maximum distance, average distance, or the like) between the baseline and the peak of the reference sample in the reference frequency range may be used. As the magnitude of the peak, for example, a value corresponding to the area between the baseline and the peak of the reference sample in the reference frequency range may be used. As the magnitude of the peak, for example, a value corresponding to the peak position or area of the reference frequency range in the differential value of the frequency characteristic of the reference sample may be used.

As shown in FIG. 11, for example, when the magnitude (differential value) of the peak of the frequency characteristic of the measurement target object S in the reference frequency range is Y, the water content of the measurement target object S is X referring to the reference information R. Step S24 corresponds to each of the sixth step of the hygroscopicity evaluation method and the third step of the water content evaluation method.

Figure 12:
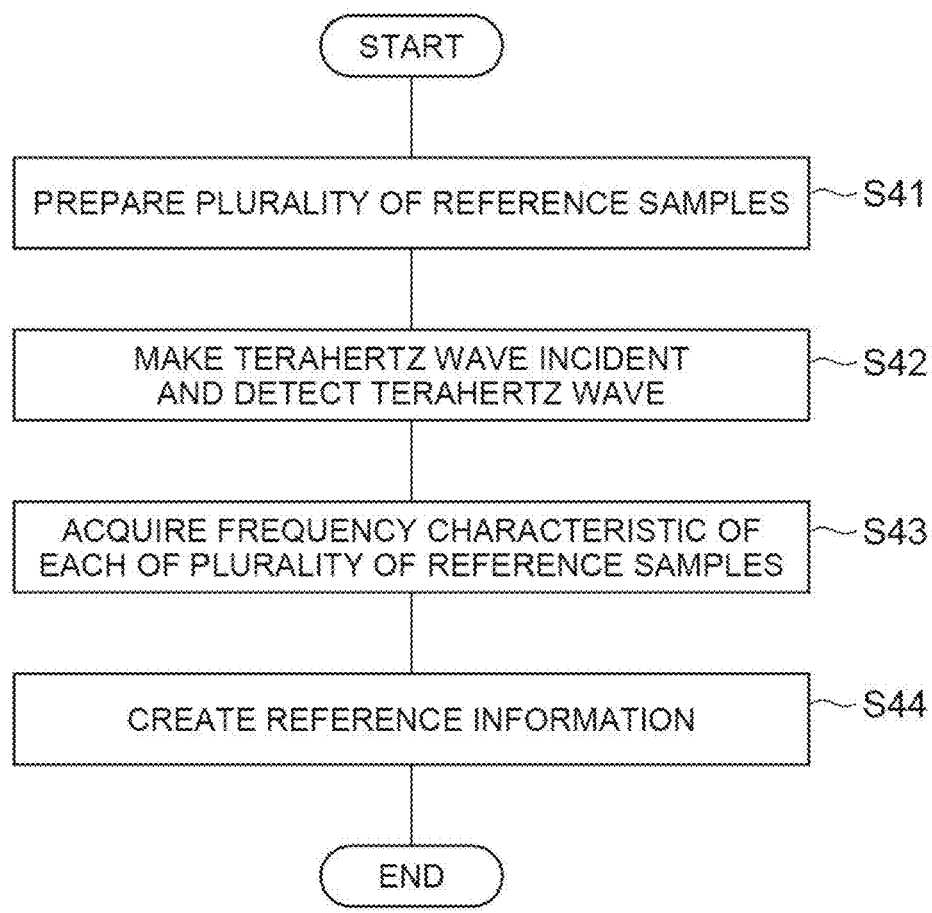
FIG. 12 is a flowchart of a method for creating the reference information shown in FIG. 11.

Next, a method of creating the reference information R will be described. As shown in FIG. 12, a plurality of reference samples having different water contents are prepared (step S41). The water content of each of the plurality of reference samples is adjusted by performing the water absorption/dehydration treatment, as in step S1. Each water content is calculated, for example, from the weight difference before and after the process of step S1. In addition, if the water content of each of the plurality of reference samples can be made different, one of the plurality of reference samples may not be subjected to the water absorption/dehydration treatment. Step S41 corresponds to each of the seventh step of the hygroscopicity evaluation method and the fourth step of the water content evaluation method.

Then, the terahertz wave T is made incident on each of the plurality of reference samples, and the terahertz wave T from each of the plurality of reference samples is detected (step S42). As a result, an electric field waveform (detection result) of each of the plurality of reference samples is acquired. Thus, in step S42, the terahertz wave attenuated total reflection spectroscopy is used. Step S42 corresponds to each of the eighth step of the hygroscopicity evaluation method and the fifth step of the water content evaluation method.

Then, the frequency characteristic of each of the plurality of reference samples is acquired (step S43). Specifically, the frequency characteristic of the reference sample is calculated based on the reference electric field waveform and the electric field waveform of the reference sample. Then, the reference information R is created based on the frequency characteristic of each of the plurality of reference samples and the water content of each of the plurality of reference samples (step S44). Step S44 corresponds to each of the ninth step of the hygroscopicity evaluation method and the sixth step of the water content evaluation method.

In step S44, the reference information R is created based on the magnitude (differential value) of the peak of the frequency characteristic of each of the plurality of reference samples in the reference frequency range and the water content of each of the plurality of reference samples. Specifically, a graph is created with the water content on the horizontal axis and the magnitude of the peak on the vertical axis, and points indicating the water content and the magnitude of the peak corresponding to each other are plotted on the graph (see FIG. 11). Then, the reference information R is calculated by performing the above-described regression analysis on the plurality of plotted points.

[Functions and Effects of Water Content Evaluation Method]

As described above, in the water content evaluation method, in the second step, the terahertz wave T is used to acquire a detection result for the measurement target object S containing a clay mineral. In the third step, the water content of the measurement target object S is evaluated based on the reference information R indicating the relationship between the magnitude of the peak of the frequency characteristic of the reference sample in the reference frequency range and the water content of the reference sample and the magnitude of the peak of the frequency characteristic of the measurement target object S in the reference frequency range. In this manner, by using the terahertz wave T, the water content of the measurement target object S can be evaluated, for example, without chemical reaction (non-destructively) and without requiring prevention of exposure to radiation. In addition, the water content can be easily evaluated as compared with a case where the water content is evaluated based on the weight difference before and after the drying treatment. Therefore, according to this water content evaluation method, it is possible to easily evaluate the water content of the measurement target object S. Since clay minerals with high hygroscopicity (for example, montmorillonite) are used as cosmetics, soil improvement materials, and the like, the evaluation of the water content of such clay minerals is very important.

The water content evaluation method further includes: a fourth step of preparing a plurality of reference samples having different water contents; a fifth step of acquiring a detection result for each of the plurality of reference samples by making the terahertz wave T incident on each of the plurality of reference samples and detecting the terahertz wave T from each of the plurality of reference samples; and a sixth step of creating the reference information R based on the frequency characteristics of each of the plurality of reference samples calculated from the detection result and the water content of each of the plurality of reference samples. In the sixth step, the reference information R is created based on the magnitude of the peak of the frequency characteristic of each of the plurality of reference samples in the reference frequency range and the water content of each of the plurality of reference samples. In this manner, by using the terahertz wave T, it is possible to easily acquire the reference information R indicating the relationship between the magnitude of the peak of the frequency characteristic of the reference sample in the reference frequency range and the water content of the reference sample.

In the sixth step, the differential value of the frequency characteristic of each of the plurality of reference samples in the reference frequency range is used as the magnitude of the peak of the frequency characteristic of each of the plurality of reference samples in the reference frequency range. Therefore, it is possible to easily grasp the magnitude of the peak of the frequency characteristic of each of the plurality of reference samples in the reference frequency range.

The clay mineral is montmorillonite. The reference frequency range is 2.7 THz to 3 THz. Therefore, it is possible to easily evaluate the water content of the measurement target object S containing montmorillonite as a clay mineral.

In the second step, the terahertz wave attenuated total reflection spectroscopy is used. Therefore, it is possible to easily and reliably evaluate the water content of the measurement target object S.

Second Embodiment

Next, a hygroscopicity evaluation method and a water content evaluation method according to a second embodiment will be described. In the present embodiment, interlayer water evaluation is performed to evaluate interlayer water contained in the measurement target object S based on first reference information, and free water evaluation is performed to evaluate free water contained in the measurement target object S is evaluated based on second reference information (the sixth step of the hygroscopicity evaluation method or the third step of the water content evaluation method). The interlayer water is the water entering between crystal layers in the water present in the crystal structure of the clay mineral. The free water is the water remaining outside the crystal layers in the water present in the crystal structure of the clay mineral.

Figure 13:
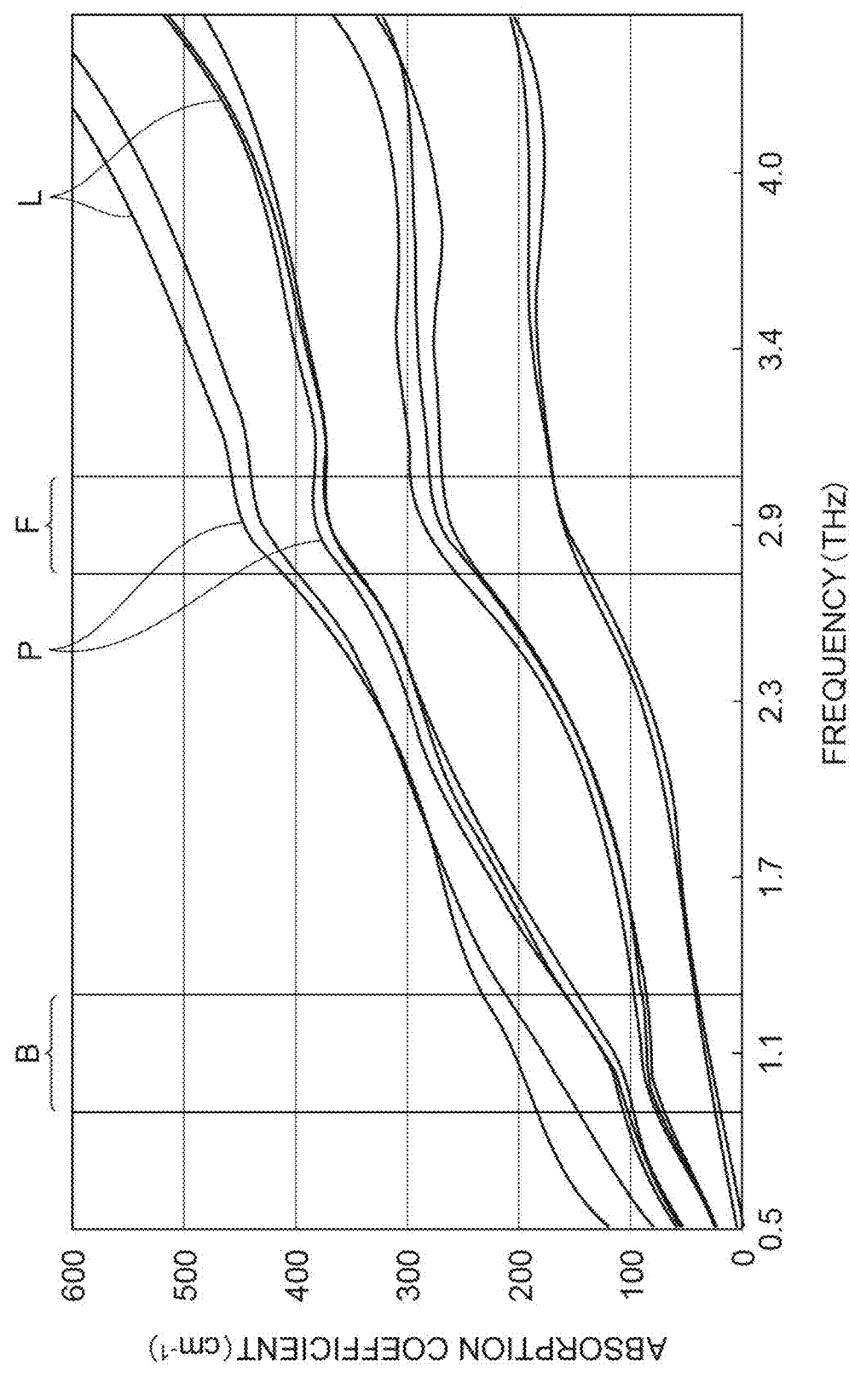
FIG. 13 is a diagram showing the frequency characteristic of each of a plurality of reference samples according to a second embodiment.

The first reference information is created in the same manner as in the first embodiment. Specifically, first, the frequency characteristic of each of a plurality of reference samples having different water contents is acquired. FIG. 13 is a diagram showing the frequency characteristic L of each reference sample according to the present embodiment. As shown in FIG. 13, each frequency characteristic L includes a peak P in the reference frequency range F. Each frequency characteristic L does not include a peak in a base frequency range B. The base frequency range B is a frequency band corresponding to the baseline of the frequency characteristic L. The base frequency range B is a region different from the reference frequency range F in the frequency band of the frequency characteristic L. The base frequency range B is an arbitrary range in the frequency band of the frequency characteristic L excluding the reference frequency range F. The reference sample is montmorillonite with relatively high purity, like the reference sample in the first embodiment. The reference sample may be a sample of the measurement target object S.

Figure 14:
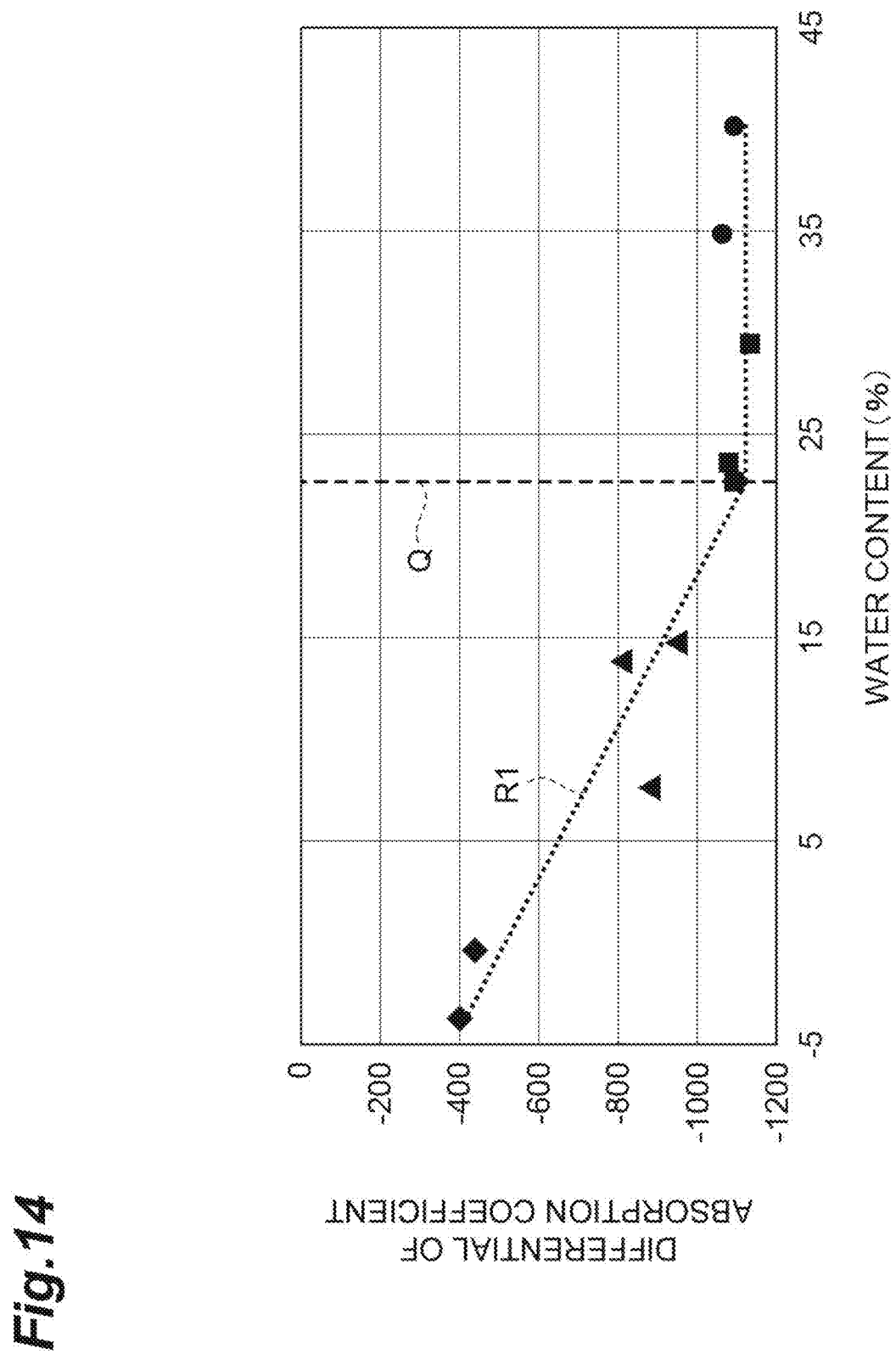
FIG. 14 is a diagram showing first reference information according to the second embodiment.

FIG. 14 is a diagram showing first reference information R1. As shown in FIG. 14, assuming that the horizontal axis indicates the water content of the reference sample (weight difference before and after water absorption/dehydration treatment) and the vertical axis indicates the magnitude of the peak P of the frequency characteristic L of the reference sample in the reference frequency range F, the first reference information R1 indicates the correlation between the water content of the reference sample and the magnitude of the peak P of the frequency characteristic L of the reference sample. In the first reference information R1, the differential value (secondary differential value) of the frequency characteristic L of the reference sample in the reference frequency range F is used as the magnitude of the peak P of the frequency characteristic L of the reference sample in the reference frequency range F. In the following description, the "differential value (secondary differential value) of the frequency characteristic L of the reference sample in the reference frequency range F" will be referred to as a "peak value of the reference sample".

In the first reference information R1, when the water content (horizontal axis) is equal to or less than a predetermined value Q, the peak value (vertical axis) of the reference sample changes linearly with the change in water content. In the first reference information R1, when the water content is larger than the predetermined value Q, the peak value of the reference sample maintains a fixed value (remains almost unchanged) even if the water content changes. In the present embodiment, the predetermined value Q is, for example, any value between 20% and 30%. The predetermined value Q is, for example, approximately 22.5%. The predetermined value Q may differ depending on the type of reference sample.

Figure 15:
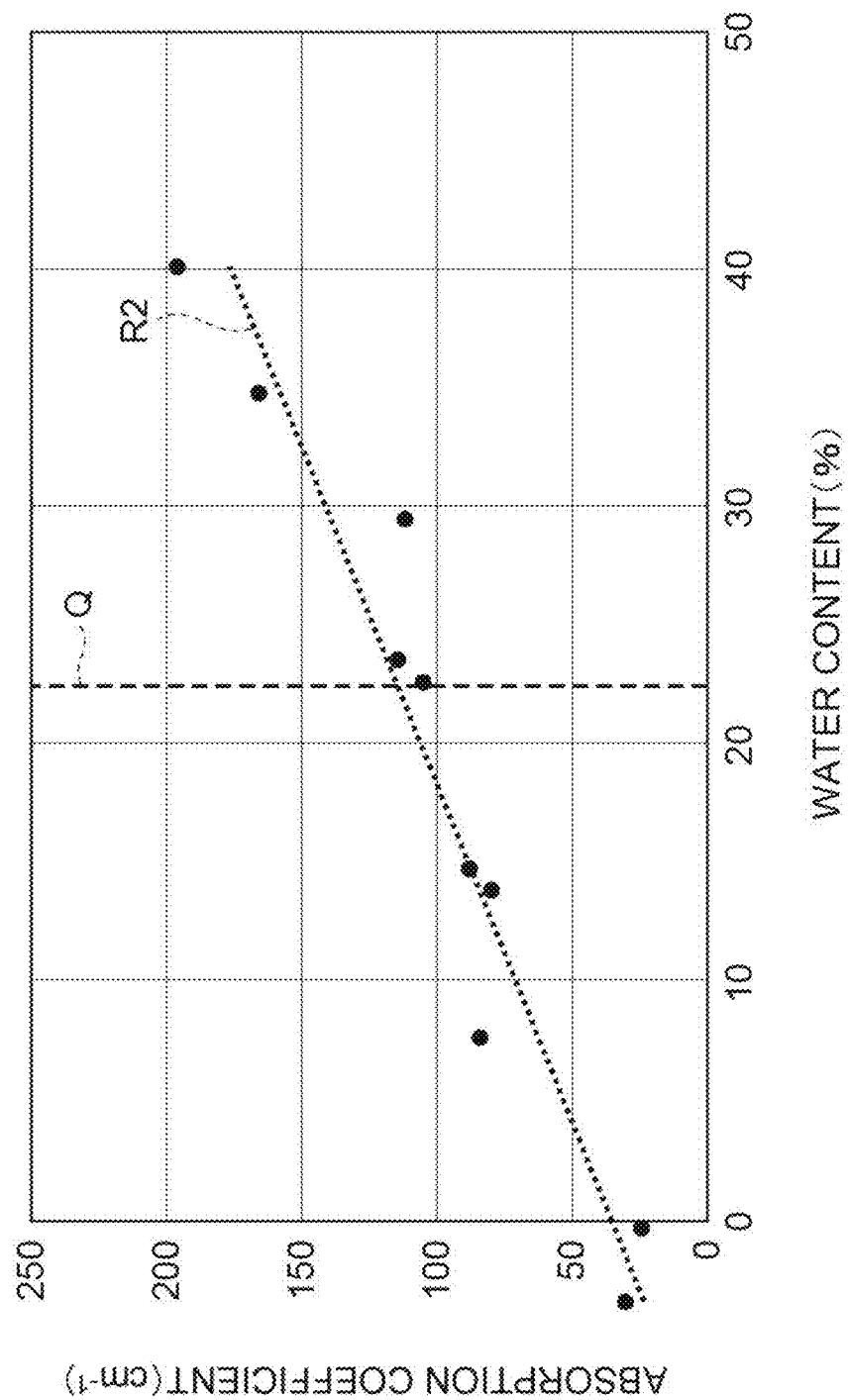
FIG. 15 is a diagram showing second reference information according to the second embodiment.

FIG. 15 is a diagram showing second reference information R2. As shown in FIG. 15, assuming that the horizontal axis indicates the water content of the reference sample and the vertical axis indicates the frequency characteristic of the reference sample in the base frequency range B (hereinafter, referred to as a "base value of the reference sample"), the second reference information R2 indicates the correlation between the water content of the reference sample and the base value of the reference sample. In the second reference information R2, in both the case where the water content (horizontal axis) is equal to or less than the predetermined value Q and the case where the water content is larger than the predetermined value Q, the base value of the reference sample changes linearly with the change in water content.

In the interlayer water evaluation, the interlayer water contained in the measurement target object S is evaluated based on the above-described first reference information R1 and the frequency characteristic of the measurement target object S, and in the free water evaluation, the free water contained in the measurement target object S is evaluated based on the above-described second reference information R2 and the frequency characteristic of the measurement target object S. Specifically, first, the measurement target object S containing montmorillonite as a clay mineral is prepared and then the frequency characteristic of the measurement target object S is acquired, as in the first embodiment.

In the interlayer water evaluation, the interlayer water contained in the measurement target object S is evaluated based on the first reference information R1 and the magnitude of the peak of the frequency characteristic of the measurement target object S in the reference frequency range F. In the interlayer water evaluation, the differential value (secondary differential value) of the frequency characteristic of the measurement target object S in the reference frequency range F is used as the magnitude of the peak of the frequency characteristic of the measurement target object S in the reference frequency range F. In the following description, the differential value (secondary differential value) of the frequency characteristic of the measurement target object S in the reference frequency range F will be referred to as a "peak value of the measurement target object S". In the free water evaluation, the free water contained in the measurement target object S is evaluated based on the second reference information R2 and the frequency characteristic of the measurement target object S in the base frequency range B (hereinafter referred to as a "base value of the measurement target object S").

Based on the first reference information R1 (see FIG. 14), it can be seen that when the water content corresponding to the peak value of the measurement target object S is equal to or less than the predetermined value Q, the larger the water content of the measurement target object S, the larger the amount of interlayer water contained in the measurement target object S. Based on the second reference information R2 (see FIG. 15), it can be seen that when the water content corresponding to the base value of the measurement target object S is equal to or less than the predetermined value Q, the larger the water content of the measurement target object S, the larger the amount of free water contained in the measurement target object S.

Based on the first reference information R1, it can be seen that when the water content corresponding to the peak value of the measurement target object S is larger than the predetermined value Q, the amount of interlayer water contained in the measurement target object S is approximately the same even if the water content of the measurement target object S is different. Based on the second reference information R2, it can be seen that when the water content corresponding to the base value of the measurement target object S is larger than the predetermined value Q, the larger the water content of the measurement target object S, the larger the amount of free water contained in the measurement target object S.

As described above, in the present embodiment, by using the differential value of the frequency characteristic L of the reference sample in the reference frequency range F as the magnitude of the peak P of the frequency characteristic L of the reference sample in the reference frequency range F and using the differential value of the frequency characteristic of the measurement target object S in the reference frequency range F as the magnitude of the peak of the frequency characteristic of the measurement target object S in the reference frequency range F, the interlayer water evaluation for evaluating the interlayer water contained in the measurement target object S is performed. In this manner, by evaluating the interlayer water contained in the measurement target object S, it becomes possible to evaluate the water content of the measurement target object S in more detail.

In the present embodiment, the free water evaluation is further performed to evaluate the free water contained in the measurement target object S based on the second reference information R2 indicating the relationship between the frequency characteristic L of the reference sample in the base frequency range B different from the reference frequency range F and the water content of the reference sample and the frequency characteristic of the measurement target object S in the base frequency range B. In this manner, by evaluating the free water contained in the measurement target object S in addition to the interlayer water contained in the measurement target object S, it becomes possible to evaluate the water content of the measurement target object S in more detail.

Figure 16A:
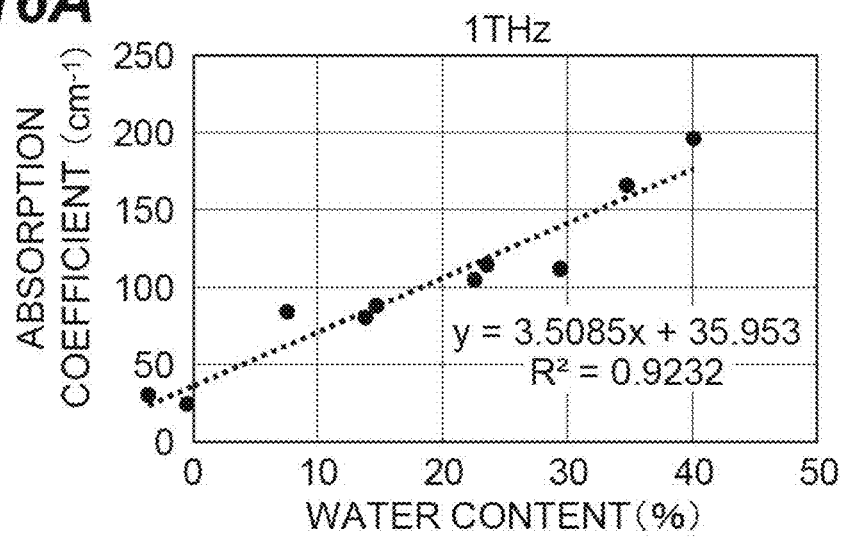
FIGS. 16A, 16B and 16C are diagrams showing the relationship between the frequency characteristic in a base frequency range and the water content.
Figure 16B:
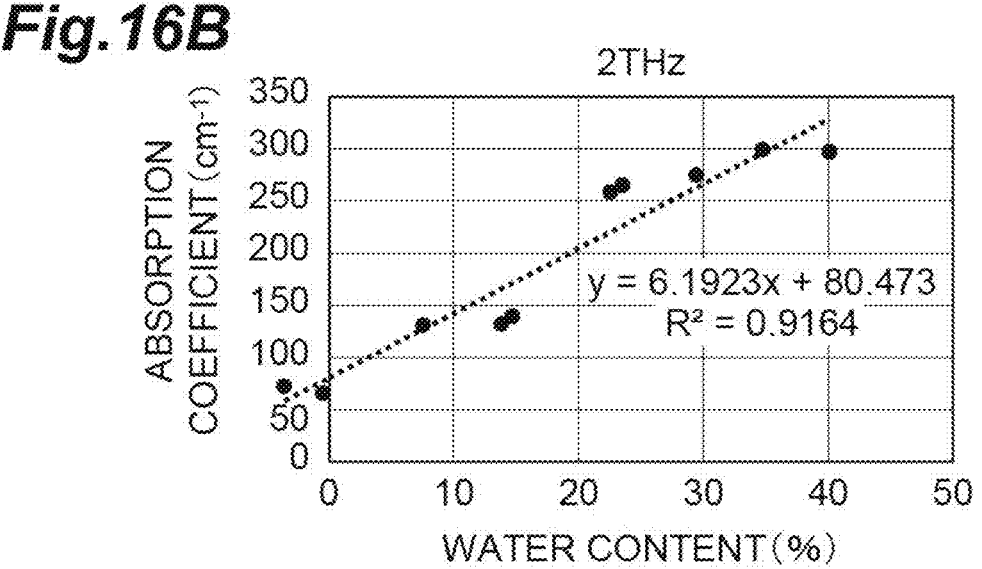
Figure 16C:
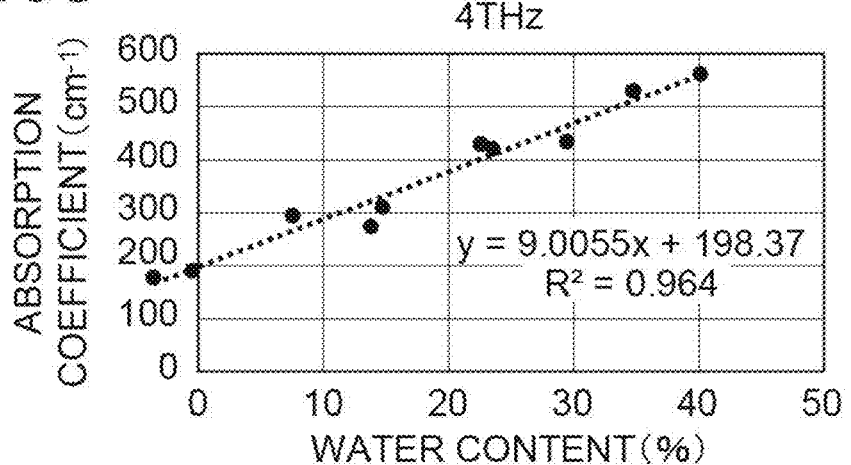
Figure 17:
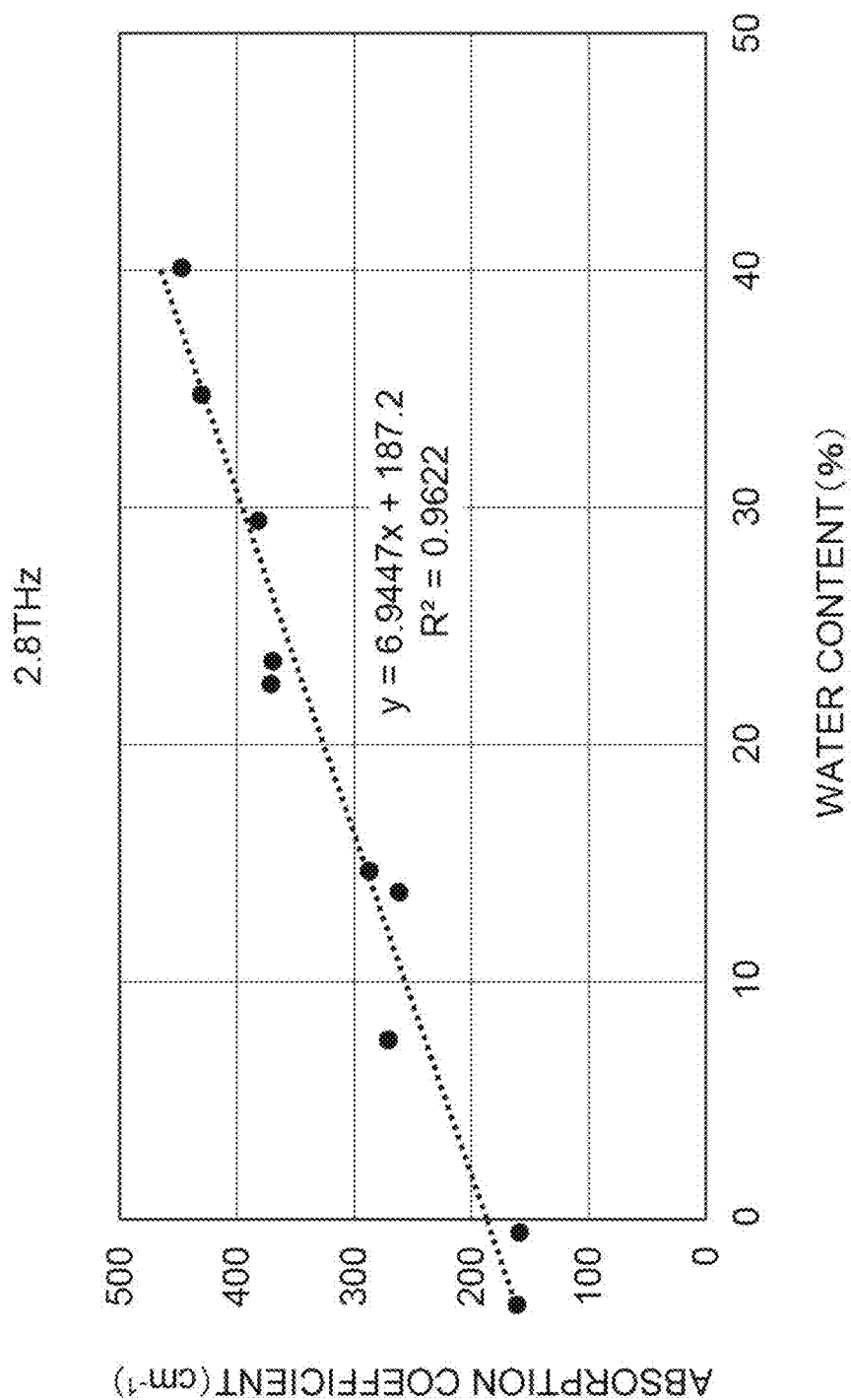
FIG. 17 is a diagram showing the relationship between the frequency characteristic in a reference frequency range and the water content.
Figure 18:
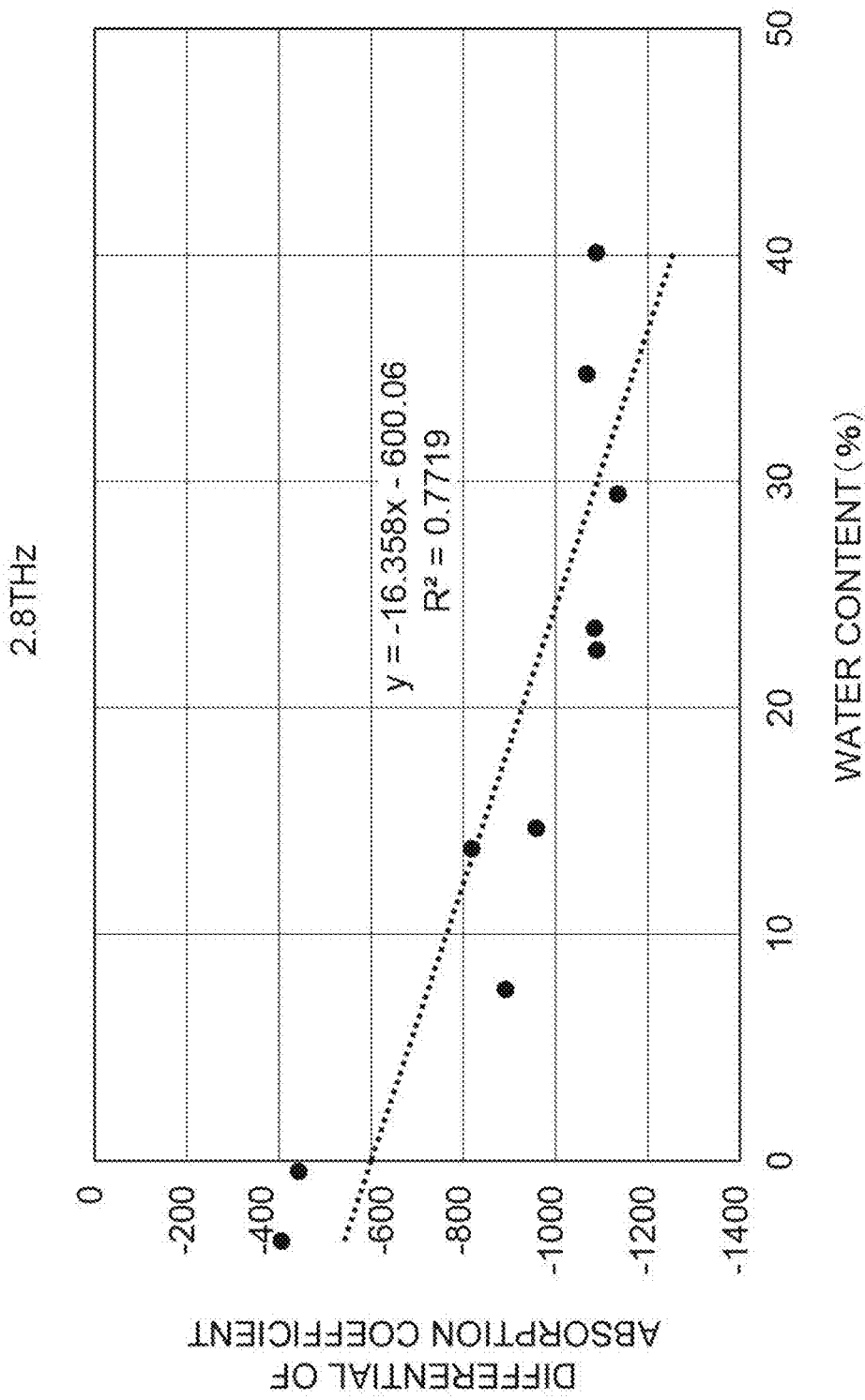
FIG. 18 is a diagram showing the relationship between the differential value of the frequency characteristic in the reference frequency range and the water content.

The inventors of the present application have found that the interlayer water contained in the measurement target object S can be evaluated by using the peak value (secondary differential value) of the measurement target object S and the free water contained in the measurement target object S can be evaluated by using the base value of the measurement target object S. Specifically, the inventors of the present application have found the following during their studies. That is, as shown in FIGS. 16A to 16C, there is a strong correlation between the frequency characteristic of the reference sample in the base frequency range B (for example, when the frequency is 1 THz, 2 THz, or 4 THz) and the water content of the reference sample, for example. In addition, as shown in FIG. 17, there is a strong correlation between the frequency characteristic of the reference sample in the reference frequency range F (for example, when the frequency is 2.8 THz) and the water content of the reference sample. On the other hand, as shown in FIG. 18, there is a weak correlation between the peak value (secondary differential value) of the reference sample in the reference frequency range F (for example, when the frequency is 2.8 THz) and the water content of the reference sample as compared with the correlation between the frequency characteristic of the reference sample in the reference frequency range F and the water content of the reference sample.

Figure 19:
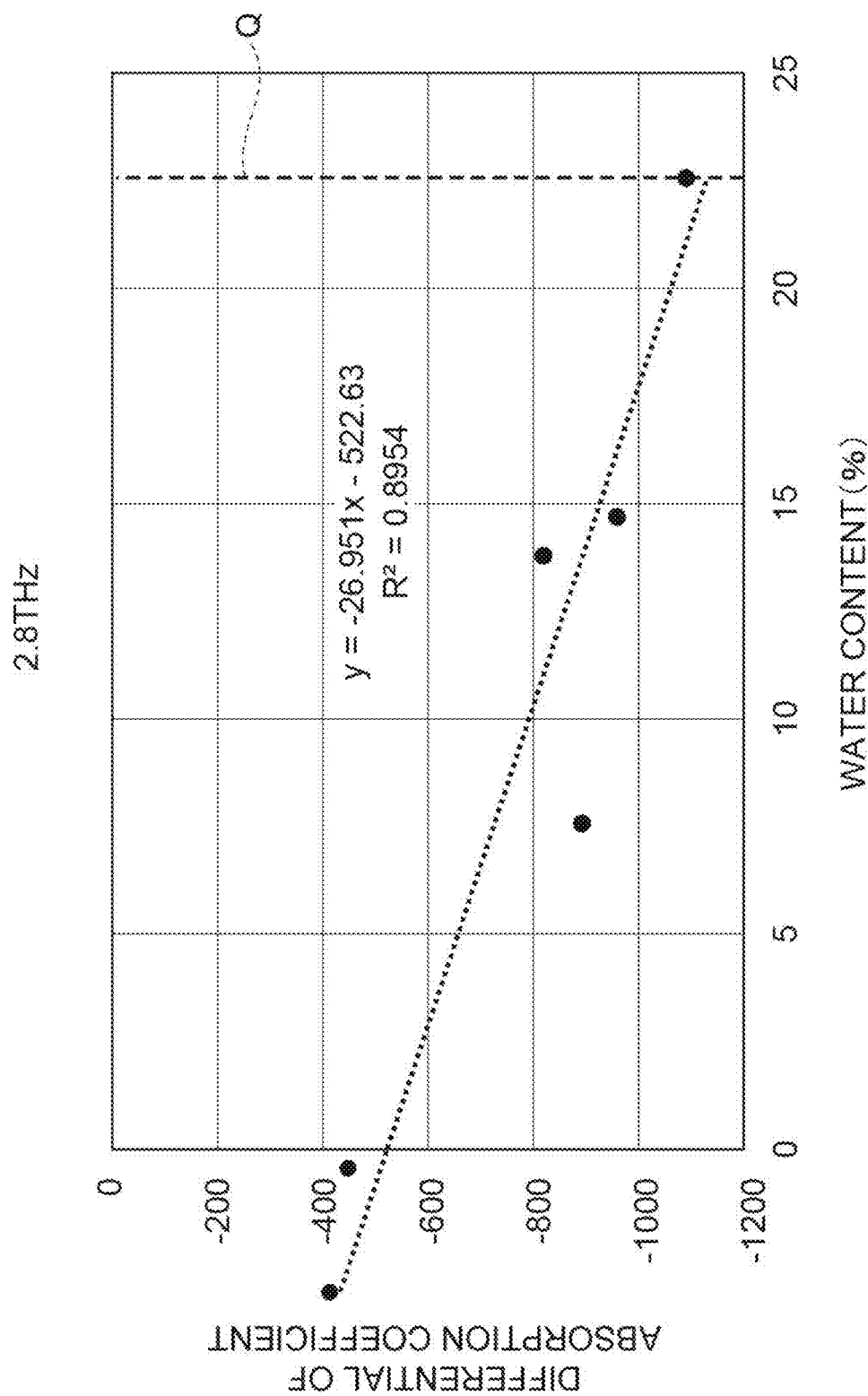
FIG. 19 is a diagram showing the relationship between the differential value of the frequency characteristic in the reference frequency range and the water content when the water content is equal to or less than a predetermined value.
Figure 20:
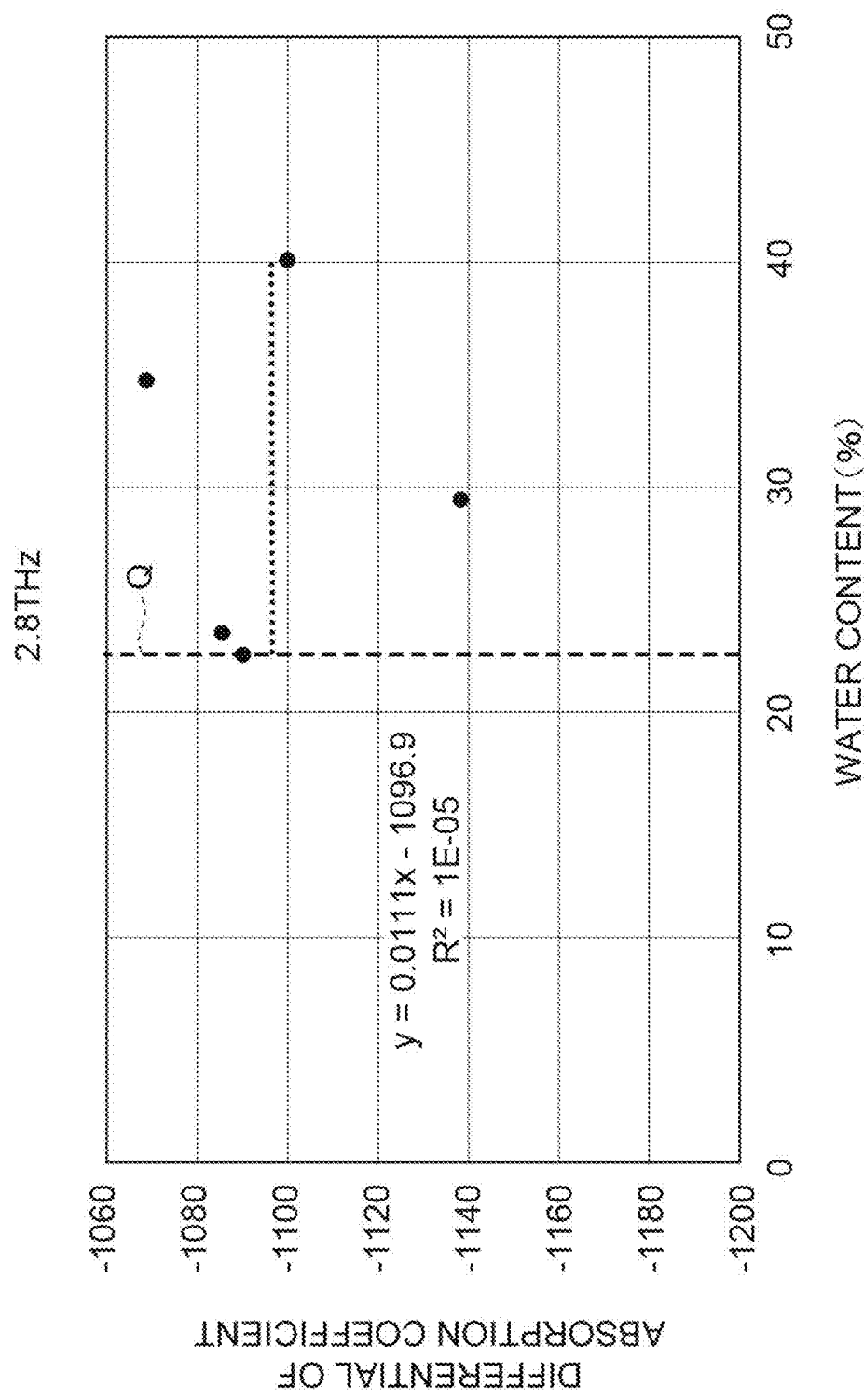
FIG. 20 is a diagram showing the relationship between the differential value of the frequency characteristic in the reference frequency range and the water content when the water content is larger than the predetermined value.

Focusing on such a tendency, the inventors of the present application performed a more detailed analysis of the correlation between the peak value (secondary differential value) and the water content of the reference sample. As a result, the inventors of the present application have found that as shown in FIG. 19, when the water content is equal to or less than the predetermined value Q, there is a strong correlation between the peak value and the water content of the reference sample, while as shown in FIG. 20, when the water content is larger than the predetermined value Q, the peak value of the reference sample remains almost unchanged even if the water content changes.

Figure 21A:
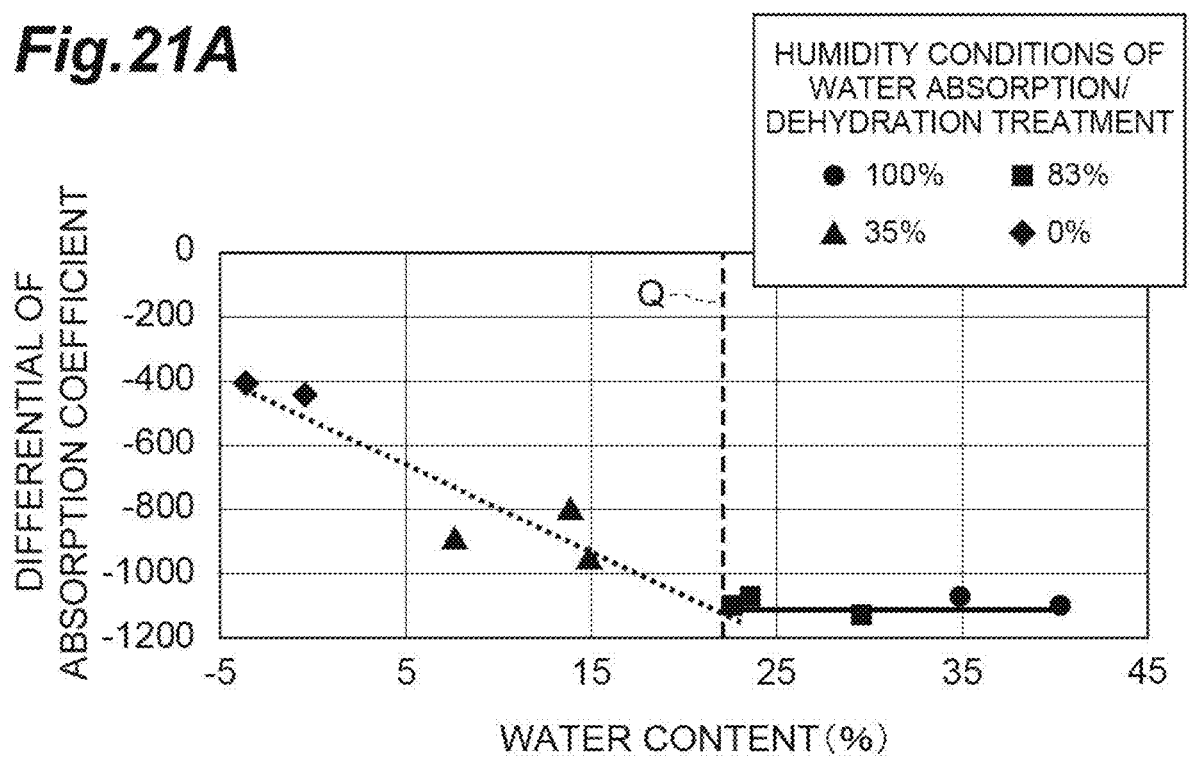
FIGS. 21A and 21B are diagrams showing the relationship between the drying strength and each of the differential values of the frequency characteristic in the reference frequency range and the frequency characteristic in the base frequency range according to a change in drying strength.
Figure 21B:
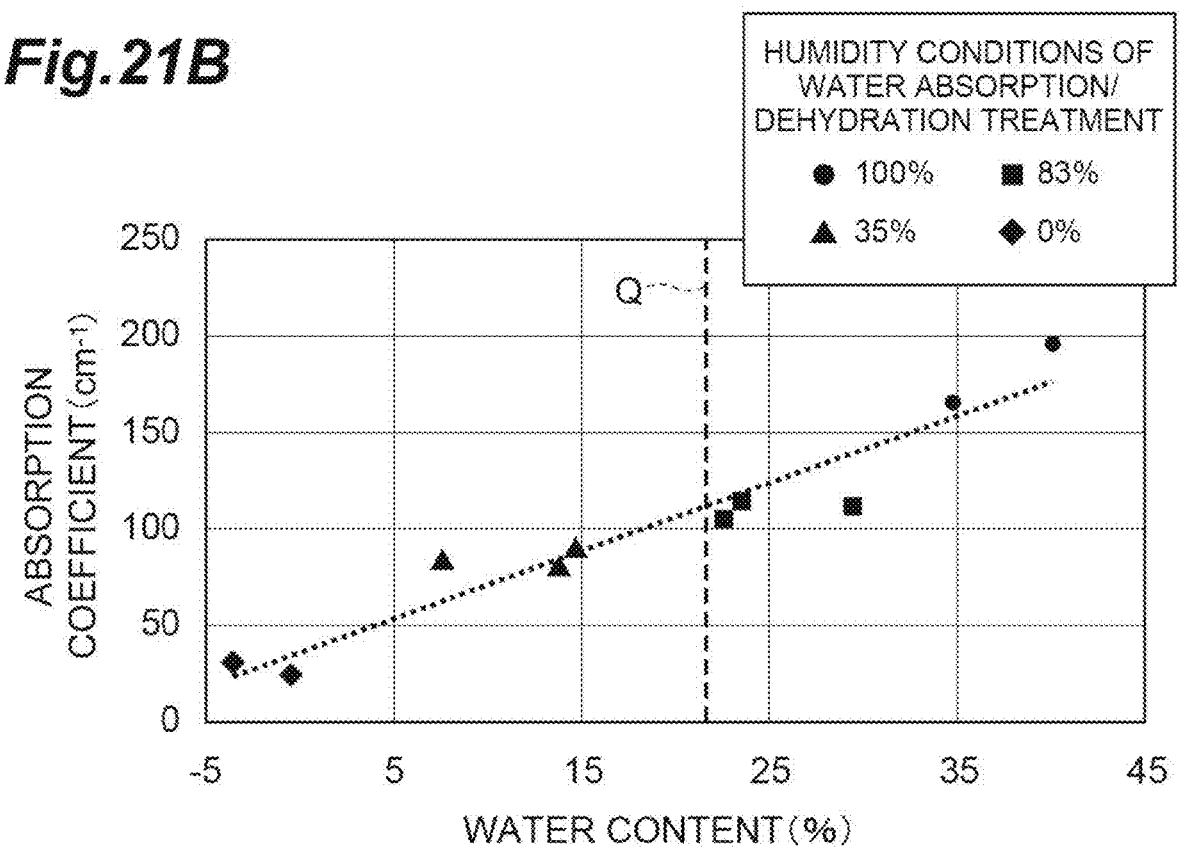

The inventors of the present application analyzed these results as follows. That is, as shown in FIGS. 21A and 21B, the water content of the reference sample decreases as the drying strength of the water absorption/dehydration treatment increases (as the humidity decreases). That is, the amount of water (interlayer water and free water) contained in the reference sample decreases as the drying strength of the water absorption/dehydration treatment increases. As shown in FIG. 21A, when the water content is larger than the predetermined value Q, the peak value of the reference sample maintains a fixed value even if the drying strength of the water absorption/dehydration treatment increases. On the other hand, when the water content is equal to or less than the predetermined value Q, the peak value of the reference sample changes linearly as the drying strength of the water absorption/dehydration treatment increases. As shown in FIG. 21B, in both the case where the water content is larger than the predetermined value Q and the case where the water content is equal to or less than the predetermined value Q, the base value of the reference sample changes linearly as the drying strength of the water absorption/dehydration treatment increases.

Figure 22:
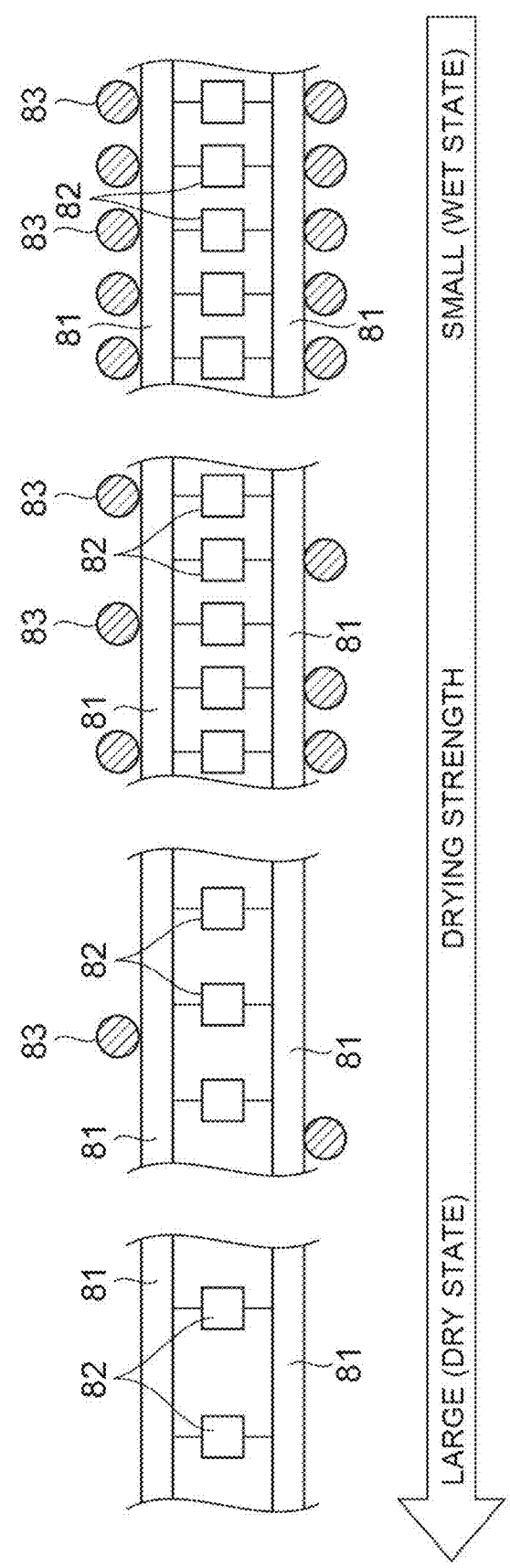
FIG. 22 is a diagram showing changes in interlayer water and free water according to a change in drying strength.

This is probably because, as shown in FIG. 22, interlayer water 82 enters between crystal layers 81 while the free water 83 remains outside the crystal layers 81. Specifically, the interlayer water 82 entering between the crystal layers 81 is not easily affected by changes in the external environment, such as water absorption/dehydration treatment. Therefore, for example, when the drying strength of the water absorption/dehydration treatment increases (when there is a change from the wet state to the dry state), the amount of interlayer water 82 does not change when the drying strength is relatively low, and starts to decrease after the drying strength increases to some extent. The free water 83 remaining outside the crystal layers 81 is susceptible to changes in the external environment, such as water absorption/dehydration treatment. Therefore, for example, when the drying strength of the water absorption/dehydration treatment increases (when there is a change from the wet state to the dry state), the amount of free water 83 is expected to decrease regardless of the magnitude of the drying strength.

As described above, the inventors of the present application succeeded in capturing different reactions of the interlayer water and the free water to the conditions of water absorption/dehydration treatment when the water content of the reference sample was changed to a value larger than the predetermined value Q. The inventors of the present application have found that the water content of the measurement target object S can be evaluated in more detail based on such results.

The interlayer water 82, which is less affected by the external environment than the free water 83, is an important entity for maintaining the water retention capacity of the clay mineral. According to the method of the present embodiment, as an evaluation of the water retention capacity of the clay mineral, it is possible to grasp the threshold value (predetermined value Q) of the drying strength for maintaining the interlayer water 82, the degree of decrease of the interlayer water 82 according to the increase in the drying strength, and the like. The method according to the present embodiment is expected to be applied as a technique used in the development of products in which functions, such as the water retention capacity of the interlayer water 82, are important (for example, agricultural soil improvement materials containing clay minerals, detox foods, and cosmetics).

Modification Examples

Figure 23:
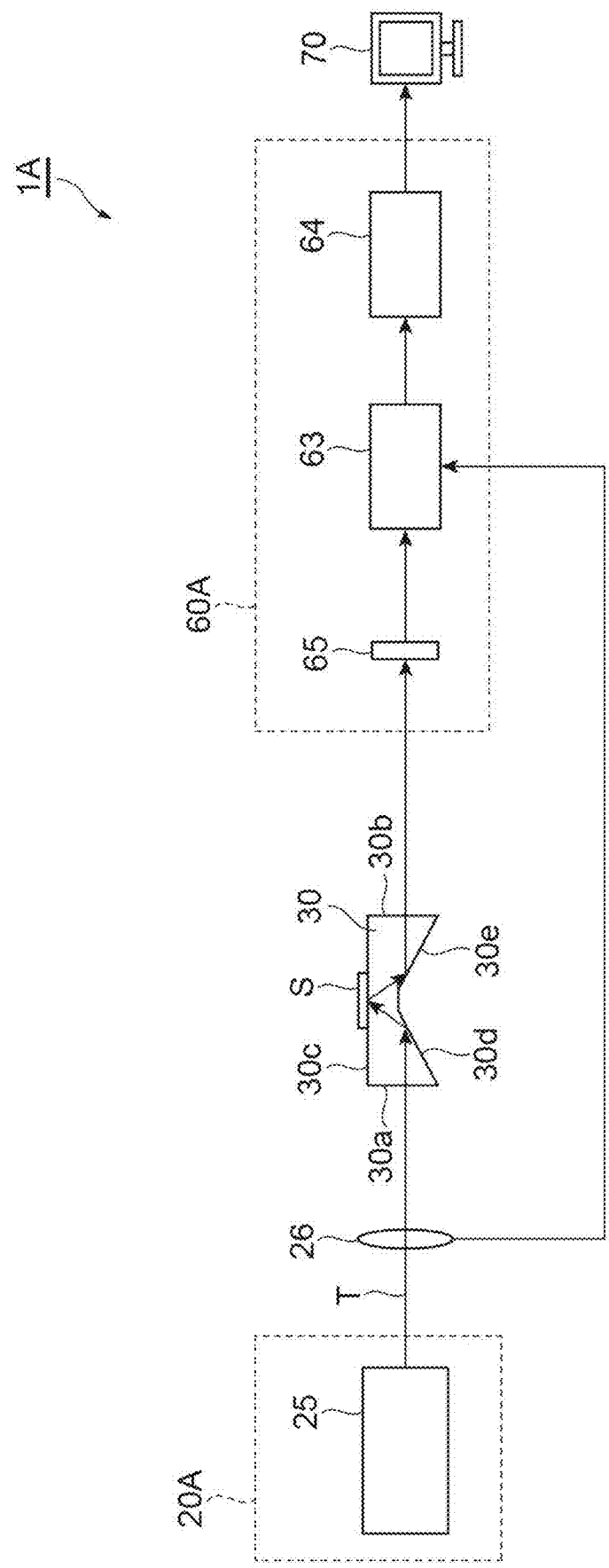
FIG. 23 is a configuration diagram of a spectrometer according to a modification example.

The present disclosure is not limited to the embodiments described above. As shown in FIG. 23, in each of the hygroscopicity evaluation method and the water content evaluation method, a spectrometer 1A may be used instead of the spectrometer 1. The spectrometer 1A includes an output unit 20A instead of the output unit 20, and a detection unit 60A instead of the detection unit 60. The spectrometer 1A does not include the adjustment unit 40 and the reflection unit 50. The spectrometer 1A includes the output unit 20A, a chopper 26, an arrangement unit 30, the detection unit 60A, and a processing unit 70.

The output unit 20A has a plurality of light sources 25. Each light source 25 outputs a terahertz wave T having a single wavelength. The light sources 25 output terahertz waves T having different frequencies. The light source 25 is, for example, a backward wave tube or a quantum cascade laser. The chopper 26 alternately repeats passing and blocking of the terahertz wave T output from the light source 25 at predetermined intervals. The terahertz wave T output from the output unit 20A is incident on the incident surface 30a of the arrangement unit 30, sequentially reflected by the first sub-reflecting surface 30d, the reflecting surface 30c, and the second sub-reflecting surface 30e, and then output from the exit surface 30b to the output to be incident on the detection unit 60A.

The detection unit 60A detects the terahertz wave T output from the arrangement unit 30. Specifically, the detection unit 60A includes a detector 65, a lock-in amplifier 63, and an A/D converter 64. The detector 65 is, for example, a Golay cell, a bolometer, a Schottky barrier diode, or a resonant tunneling diode. The electrical signal output from the detector 65 is input to the lock-in amplifier 63. The lock-in amplifier 63 synchronously detects the electrical signal output from the detector 65 at the repetition frequency of passing and blocking of the terahertz wave T in the chopper 23. The A/D converter 64 converts the analog signal from the lock-in amplifier 63 into a digital signal. The processing unit 70 calculates frequency characteristics based on the signal output from the A/D converter 64. In addition, the spectrometer 1A may not include the chopper 26 and the lock-in amplifier 63.

Figure 24:
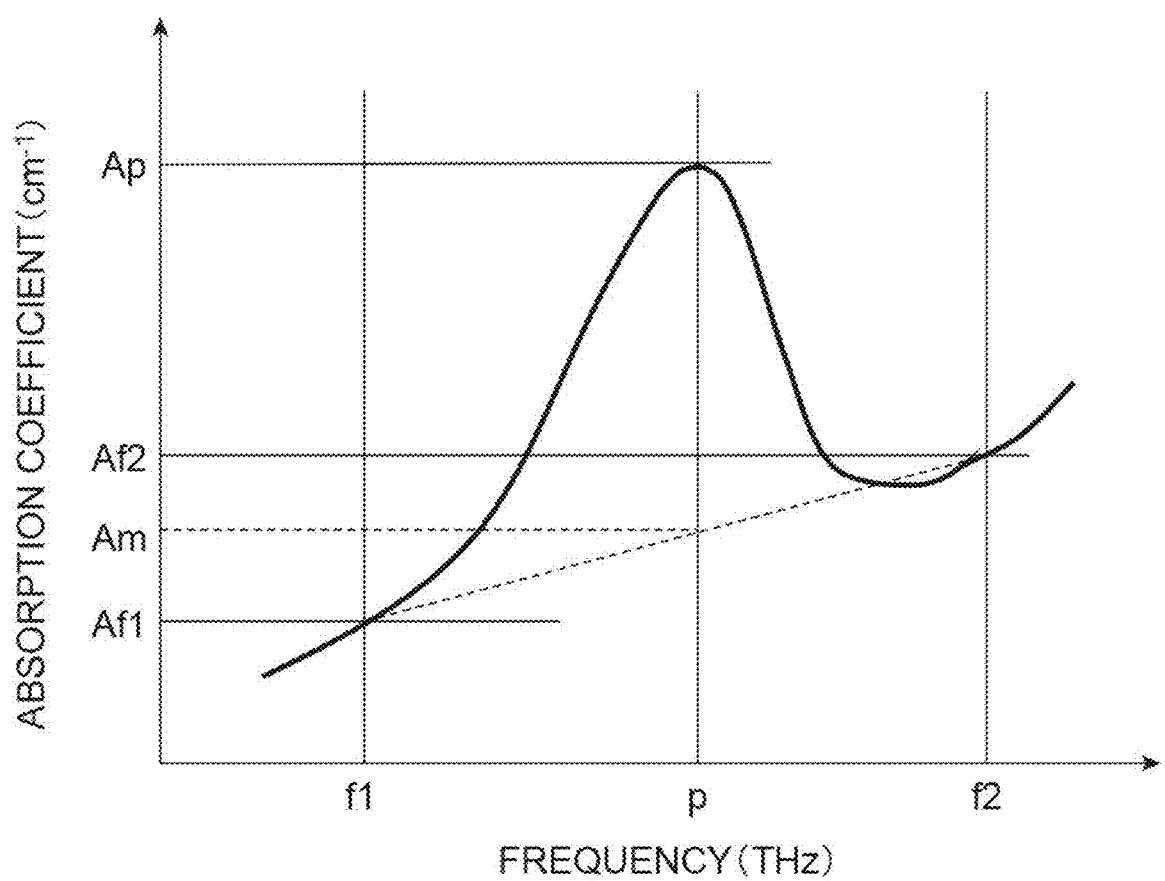
FIG. 24 is a diagram showing a frequency characteristic when the spectrometer shown in FIG. 23 is used.

In each of the hygroscopicity evaluation method and the water content evaluation method using the spectrometer 1A, the terahertz wave T having a single wavelength is incident on the measurement target object S or the like. Specifically, as shown in FIG. 24, the terahertz wave T having a frequency (reference frequency) p, the terahertz wave T having a frequency f1, and the terahertz wave T having a frequency f2 are incident on the measurement target object S or the like. f1 is a value smaller than p. f2 is a value larger than p.

Then, as frequency characteristics when the frequencies are p, f1, and f2, Ap, Af1, and Af2 are calculated, respectively. Ap, Af1 and Af2 are absorbances, for example. Then, Am is calculated based on $Am=(Af2-Af1) \times (p-f1)/(f2-f1)+Af1$ (Equation 1). Then, based on $Ap > Am+\alpha$ (Equation 2), it is determined whether or not there is a peak in the reference frequency range. If Equation 2 is satisfied, it is determined that there is a peak, and if Equation 2 is not satisfied, it is determined that there is no peak.

The reference frequency range is f1 to f2. The baseline is a straight line connecting the point (f1, Af1) and the point (f2, Af2) to each other. The peaks of the frequency characteristic in the reference frequency range are the line connecting the point (p, Ap) and the point (f1, Af1) to each other and the line connecting the point (p, Ap) and the point (f2, Af2) to each other. In addition, $\alpha$ is a buffer. $\alpha$ can be appropriately set according to the situation of the spectrometer 1A. $\alpha$ can be set based on noise or the like during measurement by the spectrometer 1A. As an example, $\alpha$ is a value of three times the standard deviation of the measurement variation.

As the frequency characteristics when the frequencies are p, f1, and f2, transmitted light intensities Ip, If1, and If2 may be used instead of the absorbances Ap, Af1, and Af2. In this case, Im is calculated based on $Im=(If2-If1) \times (p-f1)/(f2-f1)+If1$ (Equation 3). Then, based on $Ip < Im-\alpha$ (Equation 4), it is determined whether or not there is a peak at the reference frequency. If Equation 4 is satisfied, it is determined that there is a peak, and if Equation 4 is not satisfied, it is determined that there is no peak.

The baseline is a straight line connecting the point (f1, If1) and the point (f2, If2) to each other. The peaks of the frequency characteristic in the reference frequency range are the line connecting the point (p, Ip) and the point (f1, If1) to each other and the line connecting the point (p, Ip) and the point (f2, If2) to each other. In addition, in this case, reference measurement may not be performed.

According to the hygroscopicity evaluation method and the water content evaluation method using the spectrometer 1A, it is possible to evaluate the hygroscopicity of the measurement target object S and evaluate the water content of the measurement target object S with a simple configuration.

Figure 25A:
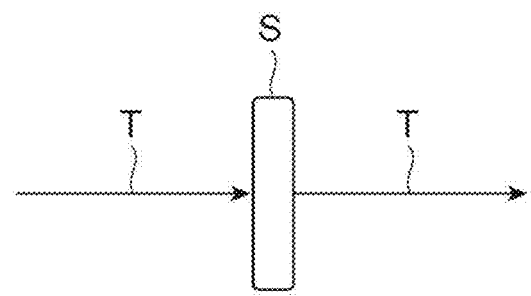
FIGS. 25A and 25B are configuration diagrams of spectrometers according to modification examples.
Figure 25B:
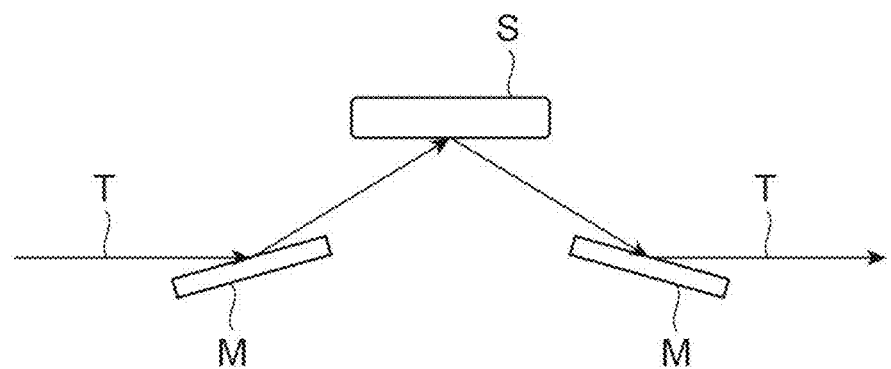

In addition, the spectrometers 1 and 1A may not be devices for carrying out the attenuated total reflection spectroscopy. As shown in FIG. 25A, in the spectrometers 1 and 1A, the terahertz wave T may pass through the measurement target object S or the like. As shown in FIG. 25B, in the spectrometers 1 and 1A, the terahertz wave T may be detected after being reflected by a pair of mirrors M and the measurement target object S.

In addition, an optical interference system may be used as the optical system of the detection units 60 and 60A. In this case, the absorption spectrum of the terahertz wave T can be directly acquired without acquiring the electric field waveform of the terahertz wave T by the detection units 60 and 60A.

In addition, as a clay mineral, the example of montmorillonite or kaolinite is illustrated. However, the hygroscopicity evaluation method and the water content evaluation method of the present disclosure may be applied to various clay minerals.

In addition, although the example in which the biasing unit 12 has a pressing jig or the like is illustrated, the biasing unit 12 may be, for example, a weight having a predetermined weight. The biasing unit 12 may apply a load corresponding to the weight of the biasing unit 12 to the contact unit 11 along the Z-axis direction. The load is transmitted to the surface Sa of the measurement target object S through the contact unit 11. In this case, for example, the magnitude of the pressure applied to the measurement target object S can be adjusted by changing the biasing unit 12 to a weight having a different weight.

A hygroscopicity evaluation method according to one aspect of the present disclosure is [1] "A hygroscopicity evaluation method for evaluating hygroscopicity of a measurement target object containing a clay mineral, comprising: a first step of preparing a first sample containing a first clay mineral as the clay mineral and a second sample containing a second clay mineral, which is the same as the first clay mineral, as the clay mineral; a second step of acquiring a first detection result for the first sample and a second detection result for the second sample by making a terahertz wave incident on each of the first and second samples and detecting the terahertz wave from each of the first and second samples; and a third step of evaluating the hygroscopicity of the measurement target object based on a first frequency characteristic of the first sample calculated from the first detection result and a second frequency characteristic of the second sample calculated from the second detection result, wherein, in the first step, at least one of the first and second samples is subjected to a water absorption/dehydration treatment, and in the third step, a magnitude of the hygroscopicity of the measurement target object is evaluated based on a difference between a magnitude of a first peak of the first frequency characteristic in a reference frequency range and a magnitude of a second peak of the second frequency characteristic in the reference frequency range."

In the hygroscopicity evaluation method described in [1], in the second step, by using the terahertz wave, the first detection result for the first sample containing the first clay mineral and the second detection result for the second sample containing the second clay mineral that is the same as the first clay mineral are acquired. In addition, in the first step, at least one of the first sample and the second sample is subjected to the water absorption/dehydration treatment, and in the third step, the magnitude of the hygroscopicity of the measurement target object is evaluated based on the difference between the magnitude of the first peak of the first frequency characteristic in the reference frequency range and the magnitude of the second peak of the second frequency characteristic in the reference frequency range. In this manner, by using the terahertz wave, the hygroscopicity of the measurement target object can be evaluated, for example, without chemical reaction and without requiring prevention of exposure to radiation. Therefore, according to this hygroscopicity evaluation method, it is possible to easily evaluate the hygroscopicity of the measurement target object.

The hygroscopicity evaluation method according to one aspect of the present disclosure may be [2] "The hygroscopicity evaluation method according to [1], wherein the clay mineral is montmorillonite or kaolinite." Therefore, it is possible to evaluate the hygroscopicity of the measurement target object containing montmorillonite or kaolinite as a clay mineral.

The hygroscopicity evaluation method according to one aspect of the present disclosure may be [3] "The hygroscopicity evaluation method according to [1] or [2], further comprising: a fourth step of preparing the measurement target object selected based on the difference between the magnitude of the first peak and the magnitude of the second peak; a fifth step of acquiring a detection result for the measurement target object by making a terahertz wave incident on the measurement target object and detecting the terahertz wave from the measurement target object; and a sixth step of evaluating a water content of the measurement target object based on a frequency characteristic of the measurement target object calculated from the detection result, wherein, in the sixth step, the water content of the measurement target object is evaluated based on first reference information indicating a relationship between a magnitude of a peak of a frequency characteristic of a reference sample in the reference frequency range and a water content of the reference sample and a magnitude of a peak of the frequency characteristic of the measurement target object in the reference frequency range." In this manner, by using the terahertz wave, the water content of the measurement target object can be evaluated, for example, without chemical reaction and without requiring prevention of exposure to radiation. Therefore, it is possible to easily evaluate the water content of the measurement target object.

The hygroscopicity evaluation method according to one aspect of the present disclosure may be [4] "The hygroscopicity evaluation method according to [3], wherein, in the sixth step, interlayer water evaluation is performed to evaluate interlayer water contained in the measurement target object by using a differential value of the frequency characteristic of the reference sample in the reference frequency range as the magnitude of the peak of the frequency characteristic of the reference sample in the reference frequency range and using a differential value of the frequency characteristic of the measurement target object in the reference frequency range as the magnitude of the peak of the frequency characteristic of the measurement target object in the reference frequency range." In this manner, by evaluating the interlayer water contained in the measurement target object, it becomes possible to evaluate the water content of the measurement target object in more detail.

The hygroscopicity evaluation method according to one aspect of the present disclosure may be [5] "The hygroscopicity evaluation method according to [4], wherein, in the sixth step, free water evaluation is further performed to evaluate free water contained in the measurement target object based on second reference information indicating a relationship between a frequency characteristic of the reference sample in a base frequency range different from the reference frequency range and a water content of the reference sample and a frequency characteristic of the measurement target object in the base frequency range." In this manner, by evaluating the free water contained in the measurement target object in addition to the interlayer water contained in the measurement target object, it becomes possible to evaluate the water content of the measurement target object in more detail.

The hygroscopicity evaluation method according to one aspect of the present disclosure may be [6] "The hygroscopicity evaluation method according to any one of [3] to [5], further comprising: a seventh step of preparing a plurality of reference samples having different water contents, each of the plurality of reference samples being the reference sample; an eighth step of acquiring a detection result for each of the plurality of reference samples by making a terahertz wave incident on each of the plurality of reference samples and detecting the terahertz wave from each of the plurality of reference samples; and a ninth step of creating the first reference information based on a frequency characteristic of each of the plurality of reference samples calculated from the detection result and the water content of each of the plurality of reference samples, wherein, in the ninth step, the first reference information is created based on a magnitude of a peak of the frequency characteristic of each of the plurality of reference samples in the reference frequency range and the water content of each of the plurality of reference samples." Therefore, by using the terahertz wave, it is possible to easily acquire the first reference information indicating the relationship between the magnitude of the peak of the frequency characteristic of the reference sample in the reference frequency range and the water content of the reference sample.

The hygroscopicity evaluation method according to one aspect of the present disclosure may be [7] "The hygroscopicity evaluation method according to [6], wherein, in the ninth step, a differential value of the frequency characteristic of each of the plurality of reference samples in the reference frequency range is used as the magnitude of the peak of the frequency characteristic of each of the plurality of reference samples in the reference frequency range." Therefore, it is possible to easily grasp the magnitude of the peak of the frequency characteristic of each of the plurality of reference samples in the reference frequency range.

The hygroscopicity evaluation method according to one aspect of the present disclosure may be [8] "The hygroscopicity evaluation method according to any one of [1] to [7], wherein, in the second step, a terahertz wave attenuated total reflection spectroscopy is used." Therefore, it is possible to easily and reliably evaluate the hygroscopicity of the measurement target object.

A water content evaluation method according to one aspect of the present disclosure is [9] "A water content evaluation method for evaluating a water content of a measurement target object containing a clay mineral, comprising: a first step of preparing the measurement target object; a second step of acquiring a detection result for the measurement target object by making a terahertz wave incident on the measurement target object and detecting the terahertz wave from the measurement target object; and a third step of evaluating the water content of the measurement target object based on a frequency characteristic of the measurement target object calculated from the detection result, wherein, in the third step, the water content of the measurement target object is evaluated based on first reference information indicating a relationship between a magnitude of a peak of a frequency characteristic of a reference sample in a reference frequency range and a water content of the reference sample and a magnitude of a peak of the frequency characteristic of the measurement target object in the reference frequency range."

In the water content evaluation method described in [9], in the second step, the terahertz wave is used to acquire the detection result for the measurement target object containing a clay mineral. In the third step, the water content of the measurement target object is evaluated based on the first reference information indicating the relationship between the magnitude of the peak of the frequency characteristic of the reference sample in the reference frequency range and the water content of the reference sample and the magnitude of the peak of the frequency characteristic of the measurement target object in the reference frequency range. In this manner, by using the terahertz wave, the water content of the measurement target object can be evaluated, for example, without chemical reaction of the measurement target object and without requiring prevention of exposure to radiation. Therefore, according to this water content evaluation method, it is possible to easily evaluate the water content of the measurement target object.

The water content evaluation method according to one aspect of the present disclosure may be [10] "The water content evaluation method according to [9], wherein, in the third step, interlayer water evaluation is performed to evaluate interlayer water contained in the measurement target object by using a differential value of the frequency characteristic of the reference sample in the reference frequency range as the magnitude of the peak of the frequency characteristic of the reference sample in the reference frequency range and using a differential value of the frequency characteristic of the measurement target object in the reference frequency range as the magnitude of the peak of the frequency characteristic of the measurement target object in the reference frequency range." In this manner, by evaluating the interlayer water contained in the measurement target object, it becomes possible to evaluate the water content of the measurement target object in more detail.

The water content evaluation method according to one aspect of the present disclosure may be [11] "The water content evaluation method according to [10], wherein, in the third step, free water evaluation is further performed to evaluate free water contained in the measurement target object based on second reference information indicating a relationship between a frequency characteristic of the reference sample in a base frequency range different from the reference frequency range and a water content of the reference sample and a frequency characteristic of the measurement target object in the base frequency range." In this manner, by evaluating the free water contained in the measurement target object in addition to the interlayer water contained in the measurement target object, it becomes possible to evaluate the water content of the measurement target object in more detail.

The water content evaluation method according to one aspect of the present disclosure may be [12] "The water content evaluation method according to any one of [9] to [11] further comprising: a fourth step of preparing a plurality of reference samples having different water contents, each of the plurality of reference samples being the reference sample; a fifth step of acquiring a detection result for each of the plurality of reference samples by making a terahertz wave incident on each of the plurality of reference samples and detecting the terahertz wave from each of the plurality of reference samples; and a sixth step of creating the first reference information based on a frequency characteristic of each of the plurality of reference samples calculated from the detection result and the water content of each of the plurality of reference samples, wherein, in the sixth step, the first reference information is created based on a magnitude of a peak of the frequency characteristic of each of the plurality of reference samples in the reference frequency range and the water content of each of the plurality of reference samples." Therefore, by using the terahertz wave, it is possible to easily acquire the first reference information indicating the relationship between the magnitude of the peak of the frequency characteristic of the reference sample in the reference frequency range and the water content of the reference sample.

The water content evaluation method according to one aspect of the present disclosure may be [13] "The water content evaluation method according to [12], wherein, in the sixth step, a differential value of the frequency characteristic of each of the plurality of reference samples in the reference frequency range is used as the magnitude of the peak of the frequency characteristic of each of the plurality of reference samples in the reference frequency range." Therefore, it is possible to easily grasp the magnitude of the peak of the frequency characteristic of each of the plurality of reference samples in the reference frequency range.

The water content evaluation method according to one aspect of the present disclosure may be [14] "The water content evaluation method according to any one of [9] to [13], wherein the clay mineral is montmorillonite, and the reference frequency range is 2.7 THz to 3 THz." Therefore, it is possible to easily evaluate the water content of the measurement target object containing montmorillonite as a clay mineral.

The water content evaluation method according to one aspect of the present disclosure may be [15] "The water content evaluation method according to any one of [9] to [14], wherein, in the second step, a terahertz wave attenuated total reflection spectroscopy is used." Therefore, it is possible to easily and reliably evaluate the water content of the measurement target object.

According to the present disclosure, it is possible to provide a hygroscopicity evaluation method capable of easily evaluating the hygroscopicity of a measurement target object and a water content evaluation method capable of easily evaluating the water content of a measurement target object.

What is claimed is:

1. A hygroscopicity evaluation method for evaluating hygroscopicity of a measurement target object containing a clay mineral, comprising:
   a first step of preparing a first sample containing a first clay mineral as the clay mineral and a second sample containing a second clay mineral, which is the same as the first clay mineral, as the clay mineral;
   a second step of acquiring a first detection result for the first sample by making a first terahertz wave incident on the first sample and detecting the first terahertz wave from the first sample and a second detection result for the second sample by making a second terahertz wave incident on the second sample and detecting the second terahertz wave from the second sample; and
   a third step of evaluating the hygroscopicity of the measurement target object based on a first frequency characteristic of the first sample calculated from the first detection result and a second frequency characteristic of the second sample calculated from the second detection result,
   wherein, in the first step, at least one of the first and second samples is subjected to a water absorption/dehydration treatment to prepare samples having different hygroscopicity, and in the third step, a magnitude of the hygroscopicity of the measurement target object is evaluated based on a difference between a magnitude of a first peak of the first frequency characteristic in a reference frequency range and a magnitude of a second peak of the second frequency characteristic in the reference frequency range.

2. The hygroscopicity evaluation method according to claim 1,
wherein the clay mineral is montmorillonite or kaolinite.

3. The hygroscopicity evaluation method according to claim 1, further comprising:
a fourth step of preparing the measurement target object selected based on the difference between the magnitude of the first peak and the magnitude of the second peak;
a fifth step of acquiring a detection result for the measurement target object by making a terahertz wave incident on the measurement target object and detecting the terahertz wave from the measurement target object; and
a sixth step of evaluating a water content of the measurement target object based on a frequency characteristic of the measurement target object calculated from the detection result,
wherein, in the sixth step, the water content of the measurement target object is evaluated based on first reference information indicating a relationship between a magnitude of a peak of a frequency characteristic of a reference sample in the reference frequency range and a water content of the reference sample and a magnitude of a peak of the frequency characteristic of the measurement target object in the reference frequency range.

4. The hygroscopicity evaluation method according to claim 3,
wherein, in the sixth step, interlayer water evaluation is performed to evaluate interlayer water contained in the measurement target object by using a differential value of the frequency characteristic of the reference sample in the reference frequency range as the magnitude of the peak of the frequency characteristic of the reference sample in the reference frequency range and using a differential value of the frequency characteristic of the measurement target object in the reference frequency range as the magnitude of the peak of the frequency characteristic of the measurement target object in the reference frequency range.

5. The hygroscopicity evaluation method according to claim 4,
wherein, in the sixth step, free water evaluation is further performed to evaluate free water contained in the measurement target object based on second reference information indicating a relationship between a frequency characteristic of the reference sample in a base frequency range different from the reference frequency range and a water content of the reference sample and a frequency characteristic of the measurement target object in the base frequency range.

6. The hygroscopicity evaluation method according to claim 3, further comprising:
a seventh step of preparing a plurality of reference samples having different water contents, each of the plurality of reference samples being the reference sample;
an eighth step of acquiring a detection result for each of the plurality of reference samples by making a terahertz wave incident on each of the plurality of reference samples and detecting the terahertz wave from each of the plurality of reference samples; and
a ninth step of creating the first reference information based on a frequency characteristic of each of the plurality of reference samples calculated from the detection result and the water content of each of the plurality of reference samples,
wherein, in the ninth step, the first reference information is created based on a magnitude of a peak of the frequency characteristic of each of the plurality of reference samples in the reference frequency range and the water content of each of the plurality of reference samples.

7. The hygroscopicity evaluation method according to claim 6,
wherein, in the ninth step, a differential value of the frequency characteristic of each of the plurality of reference samples in the reference frequency range is used as the magnitude of the peak of the frequency characteristic of each of the plurality of reference samples in the reference frequency range.

8. The hygroscopicity evaluation method according to claim 1,
wherein, in the second step, a terahertz wave attenuated total reflection spectroscopy is used.

9. The hygroscopicity evaluation method according to claim 1,
wherein, the first terahertz wave incident and the second terahertz wave incident are different terahertz wave incidents.

10. A water content evaluation method for evaluating a water content of a measurement target object containing a clay mineral, comprising:
a first step of preparing the measurement target object;
a second step of acquiring a detection result for the measurement target object by making a terahertz wave incident on the measurement target object and detecting the terahertz wave from the measurement target object; and
a third step of evaluating the water content of the measurement target object based on a frequency characteristic of the measurement target object calculated from the detection result,
wherein, in the third step, the water content of the measurement target object is evaluated based on first reference information indicating a relationship between a magnitude of a peak of a frequency characteristic of a reference sample in a reference frequency range and a water content of the reference sample and a magnitude of a peak of the frequency characteristic of the measurement target object in the reference frequency range.

11. The water content evaluation method according to claim 10,
wherein, in the third step, interlayer water evaluation is performed to evaluate interlayer water contained in the measurement target object by using a differential value of the frequency characteristic of the reference sample in the reference frequency range as the magnitude of the peak of the frequency characteristic of the reference sample in the reference frequency range and using a differential value of the frequency characteristic of the measurement target object in the reference frequency range as the magnitude of the peak of the frequency characteristic of the measurement target object in the reference frequency range.

12. The water content evaluation method according to claim 11, wherein, in the third step, free water evaluation is further performed to evaluate free water contained in the measurement target object based on second reference information indicating a relationship between a frequency characteristic of the reference sample in a base frequency range different from the reference frequency range and a water content of the reference sample and a frequency characteristic of the measurement target object in the base frequency range.

13. The water content evaluation method according to claim 10, further comprising:

a fourth step of preparing a plurality of reference samples having different water contents, each of the plurality of reference samples being the reference sample;

a fifth step of acquiring a detection result for each of the plurality of reference samples by making a terahertz wave incident on each of the plurality of reference samples and detecting the terahertz wave from each of the plurality of reference samples; and a sixth step of creating the first reference information based on a frequency characteristic of each of the plurality of reference samples calculated from the detection result and the water content of each of the plurality of reference samples, wherein, in the sixth step, the first reference information is created based on a magnitude of a peak of the frequency characteristic of each of the plurality of reference samples in the reference frequency range and the water content of each of the plurality of reference samples.

14. The water content evaluation method according to claim 13, wherein, in the sixth step, a differential value of the frequency characteristic of each of the plurality of reference samples in the reference frequency range is used as the magnitude of the peak of the frequency characteristic of each of the plurality of reference samples in the reference frequency range.

15. The water content evaluation method according to claim 10, wherein the clay mineral is montmorillonite, and the reference frequency range is 2.7 THz to 3 THz.

16. The water content evaluation method according to claim 10, wherein, in the second step, a terahertz wave attenuated total reflection spectroscopy is used.

* * * * *